(12) United States Patent  
Okumura

(10) Patent No.: US 8,223,439 B2
(45) Date of Patent: Jul. 17, 2012

(54) OPTICAL SYSTEM AND IMAGE PICKUP APPARATUS HAVING THE OPTICAL SYSTEM

(75) Inventor: Tetsuichirou Okumura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 12/984,508

(22) Filed: Jan. 4, 2011

(65) Prior Publication Data

US 2011/0164324 A1    Jul. 7, 2011

(30) Foreign Application Priority Data

Jan. 6, 2010   (JP) ................... 2010-001095

(51) Int. Cl.
*G02B 15/14* (2006.01)
(52) U.S. Cl. ........ 359/682; 359/680; 359/717; 359/740; 359/793
(58) Field of Classification Search .................. 359/680, 359/682, 717, 740, 793
See application file for complete search history.

(56) References Cited

U.S. PATENT DOCUMENTS 6,987,623 B2    1/2006 Shibayama
2006/0050406 A1*    3/2006 Ishii ........................... 359/680

FOREIGN PATENT DOCUMENTS

JP    2008-003108 A    1/2008

* cited by examiner

*Primary Examiner* — Evelyn A. Lester
(74) *Attorney, Agent, or Firm* — Canon U.S.A., Inc. IP Division

(57) ABSTRACT

An optical system includes, in order from an object side to an image side, a first lens unit, a stop, and a second lens unit. The first lens unit includes a first negative lens having a meniscus shape and a negative refractive power at a position closest to the object side and a negative lens Gn having a negative refractive power at a position closer to the image side than the first negative lens. The second lens unit includes a positive lens Gp having a positive refractive power. A material of each of the negative lens Gn and the positive lens Gp satisfies the following condition:

$$\theta gF - (-0.001682 \cdot vd + 0.6438) \geq 0.01$$

where "vd" denotes an Abbe number of a lens material and "θgF" denotes a relative partial dispersion with respect to g-line light and F-line light.

12 Claims, 18 Drawing Sheets

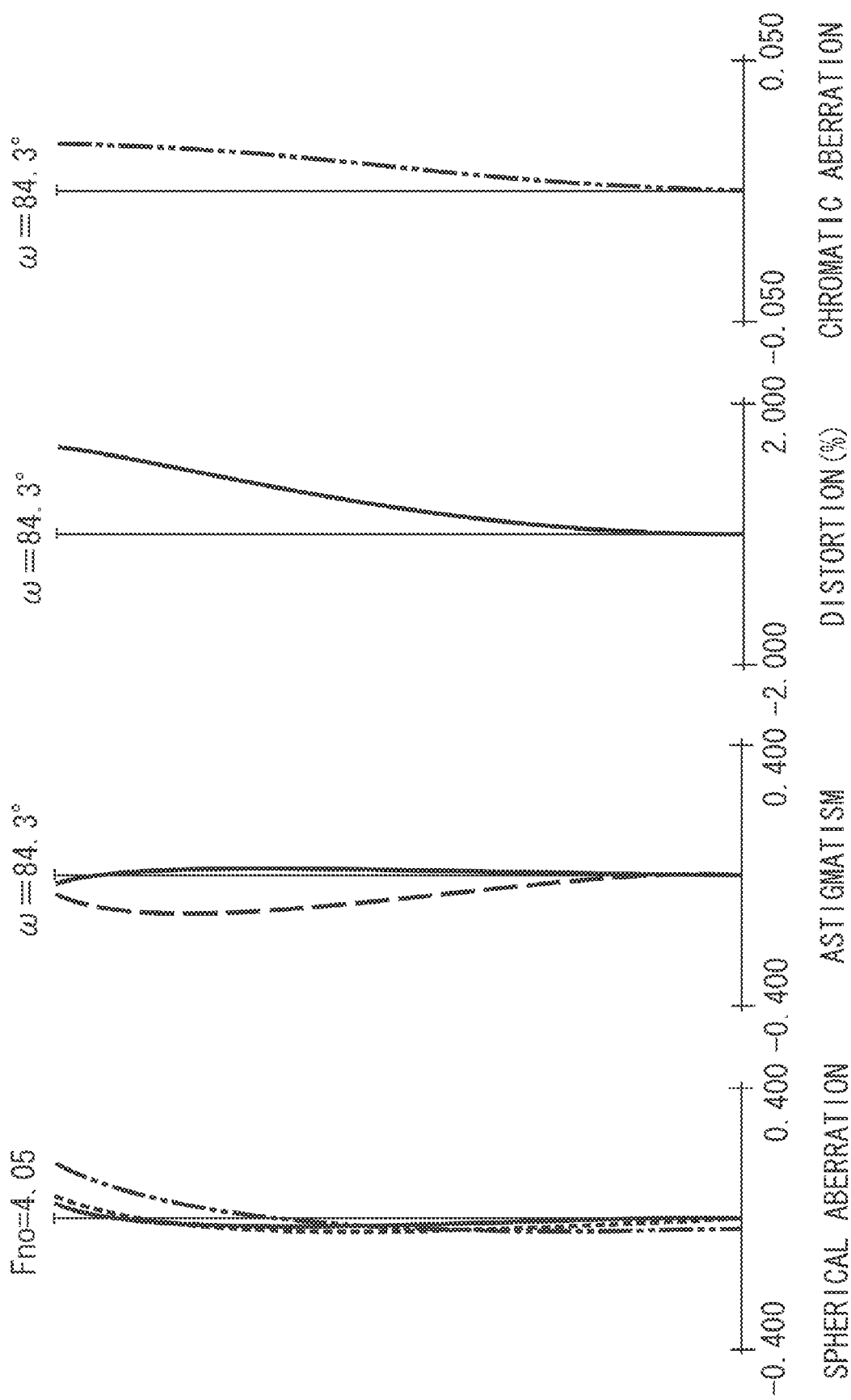

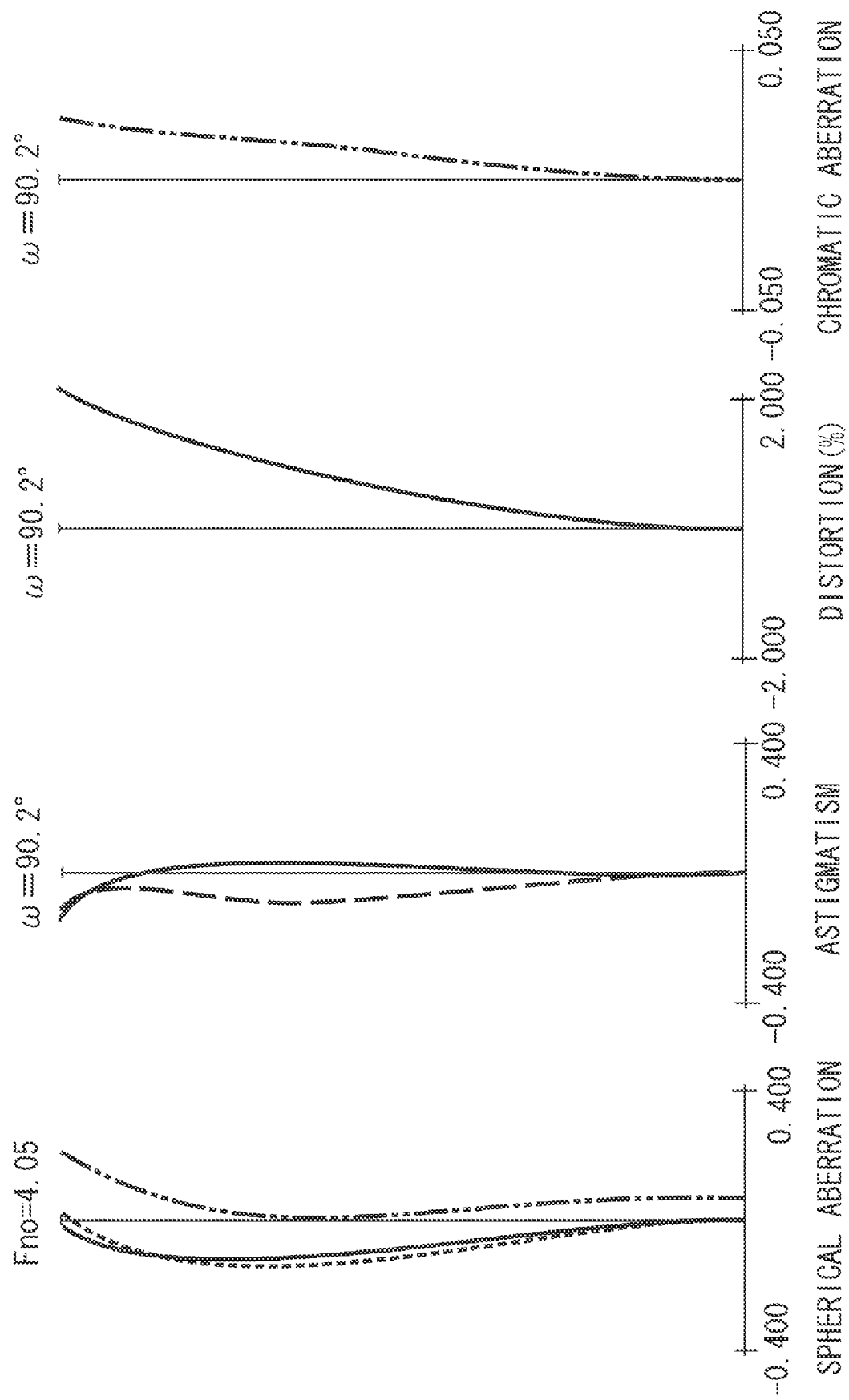

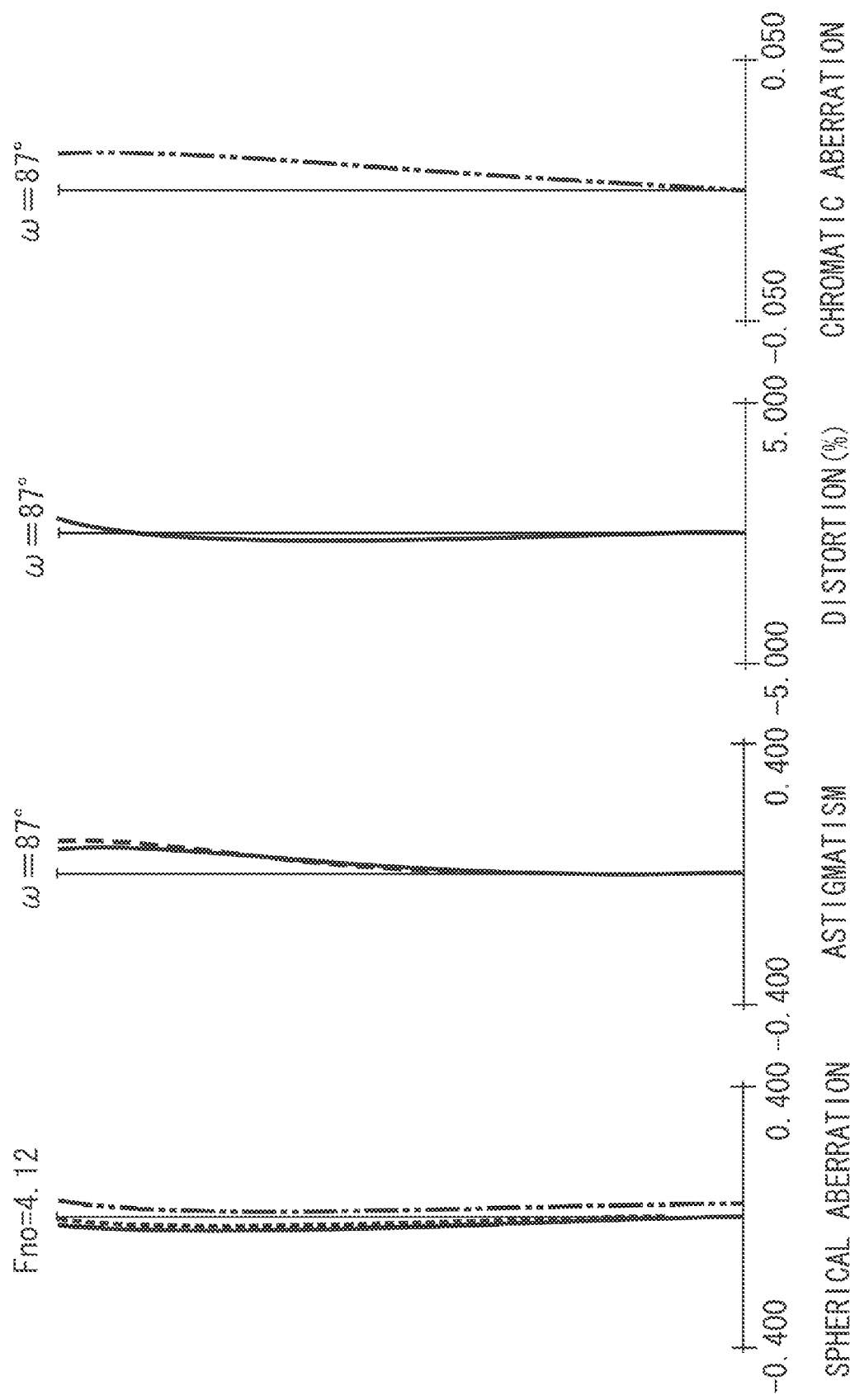

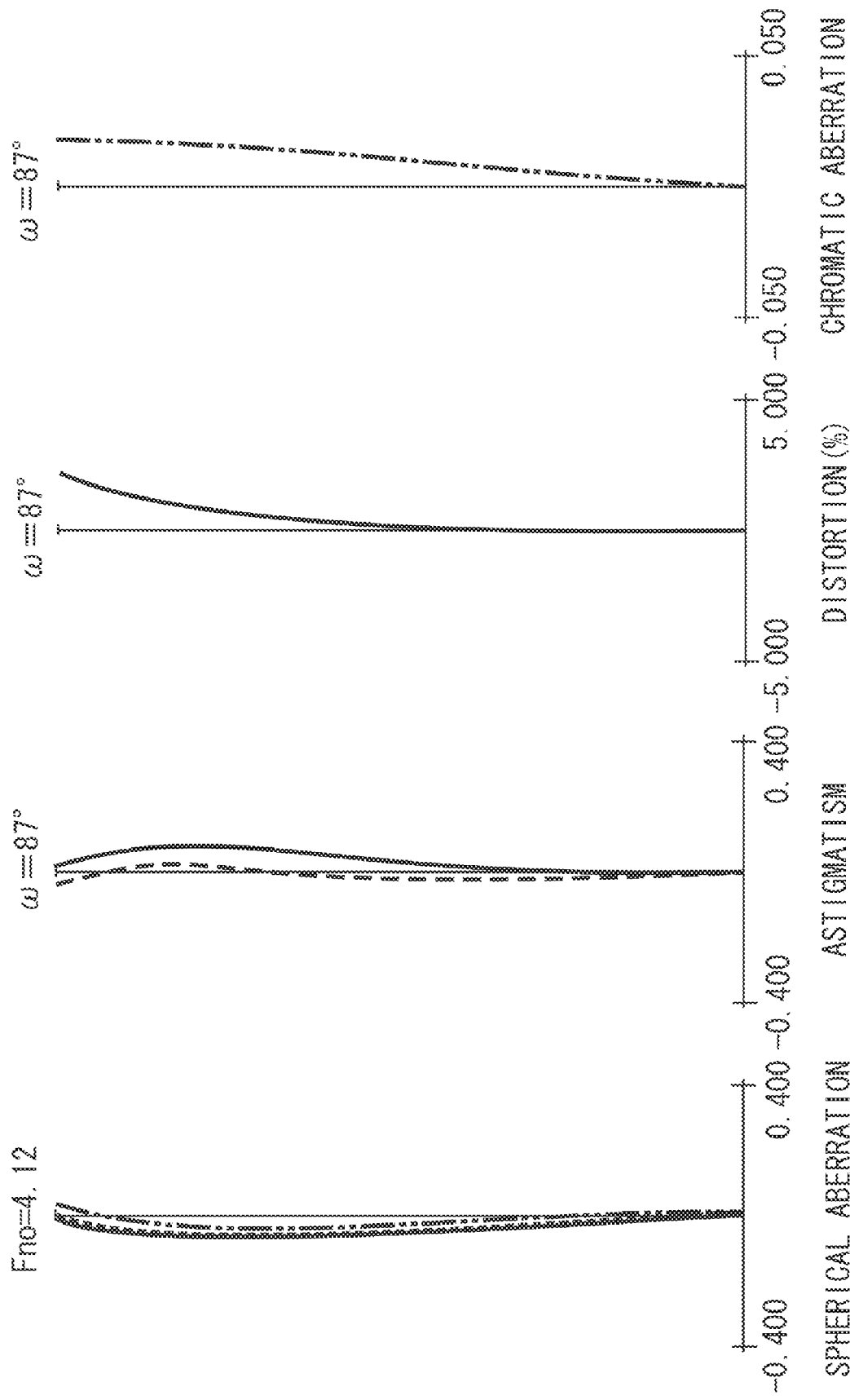

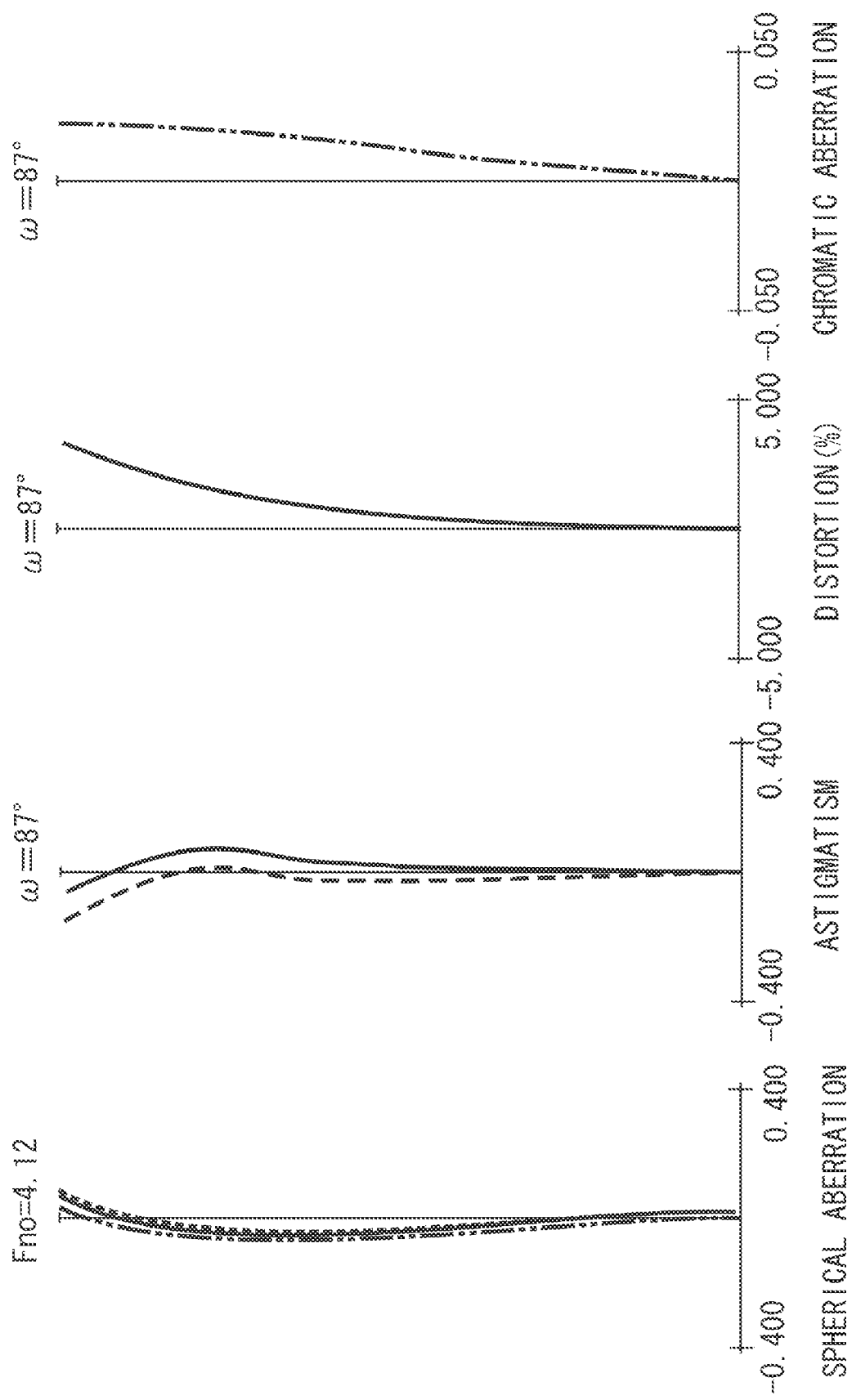

OPTICAL SYSTEM AND IMAGE PICKUP APPARATUS HAVING THE OPTICAL SYSTEM

BACKGROUND OF THE INVENTION

1. Field of the Invention

The present invention relates to an optical system and an image pickup apparatus having the optical system. In particular, the present invention relates to an optical system and an image pickup apparatus useful in a digital still camera, a video camera, a TV camera, and a silver-halide film camera.

2. Description of the Related Art

As an optical system capable of easily achieving a long back focus and a wide angle of view, a negative lead type optical system is conventionally used. In the negative lead type optical system, a lens unit having a negative refractive power is located at a position closest to the object side. Furthermore, as a negative lead type optical system having a wide angle of view, a fisheye lens or a fisheye zoom lens (hereinafter also referred to as a "fisheye optical system") is conventionally used.

The fisheye optical system is defined as an optical system that uses a special projection method for utilizing a curved distortion (barrel distortion) to obtain extremely wide-angle images. The fisheye optical system is used, for example, in shooting hemispherical images for meteorological measurement that utilizes the special barrel distortion achieved by the fisheye optical system. Fisheye optical systems enable the capturing of wide-angle images with a convex appearance, by using special mapping projection methods. As typical projection methods used in the fisheye optical system an equisolid angle projection method, in which a solid angle of an object is proportional to the area of an image formed on an image plane, an equidistance projection method, in which the angle of incidence of incident light is proportional to the image height, an orthographic projection method, and a stereographic projection method are used.

As an interchangeable fisheye optical system for a single-lens reflex (SLR) camera, U.S. Pat. No. 6,987,623 discusses a photographic lens having a very wide diagonal angle of view of about 180°, which is achieved by a large amount of negative distortion generated thereby. In general, it is necessary for a fisheye optical system to generate negative distortion. Accordingly, it is necessary to provide a high refractive power to a lens unit having a negative refractive power and disposed in front of the stop or a lens unit having a positive refractive power and disposed behind the stop. In particular, in the fisheye optical system described above, it is necessary to provide a high refractive power to a negative lens unit that is provided on the object side, whose height of incidence of off-axis light flux is high.

In the fisheye optical system, in most cases, a negative lens is located at a position closest to the object side. In the negative lens located at a position closest to the object side, the height of incidence of off-axis light flux and the refractive power of the negative lens are high. Accordingly, a large amount of chromatic aberration (in particular, chromatic aberration of magnification) may generally occur in the negative lens.

In order to prevent chromatic aberration of magnification in the negative lens located at a position closest to the object side, a low dispersion material is generally used as a material of the negative lens. However, if a lens made of a low dispersion material and having a high refractive power is used, it becomes difficult to correct the secondary spectrum.

On the other hand, Japanese Patent Application Laid-Open No. 2008-3108 discusses a fisheye lens made of a low dispersion material and having a low refractive power to correct chromatic aberration of magnification. The zoom lens discussed in U.S. Pat. No. 6,987,623 uses a lens made of a glass material having a high anomalous dispersion for a lens unit located behind the stop. However, in the zoom lens discussed in U.S. Pat. No. 6,987,623, the amount of chromatic aberration may greatly vary during zooming because sufficiently effective achromatism cannot be achieved by each movable lens unit.

On the other hand, the zoom lens discussed in Japanese Patent Application Laid-Open No. 2008-3108 uses a material having a low refractive power and a low dispersion as a material of the negative lens located at a position closest to the object side to correct chromatic aberration of magnification (in particular, the secondary spectrum). However, because the negative lens may have the maximum angle of view θ of about 180°, it becomes difficult to work up the lens. The maximum angle of view θ is expressed by the following expression:

$$\theta = \text{Arcsin}(d/r)$$

where "r" and "d" denote the radius of curvature and the effective diameter of a specific surface, respectively.

In order to achieve an optical system having a very wide angle of view, capable of effectively correcting chromatic aberration, and having a high optical performance, it is necessary to appropriately set the lens configuration of lens units located in front of and behind the stop and the material of a lens element included in each lens unit. If the lens configuration or the lens material is inappropriately set, it may become difficult to achieve a lens manufactured with a high processing accuracy and having a very wide angle of view of about 180° and a high optical performance.

SUMMARY OF THE INVENTION

The present invention is directed to an optical system that uses a lens having a shape easy to be processed into, a very wide angle of view, and a high optical performance by appropriately setting a configuration of each lens unit, particularly, the configuration of lens units located in front of and behind a stop.

According to an aspect of the present invention, an optical system includes, in order from an object side to an image side, a first lens unit, a stop, and a second lens unit. In the optical system, the first lens unit includes a first negative lens having a meniscus shape and a negative refractive power at a position closest to the object side, and a negative lens Gn having a negative refractive power at a position closer to the image side than the first negative lens, and the second lens unit includes a positive lens Gp having a positive refractive power. In the optical system, a material of each of the negative lens Gn and the positive lens Gp satisfies the following condition:

$$\theta gF - (-0.001682 \cdot vd + 0.6438) \geq 0.01$$

where "vd" denotes an Abbe number of a lens material and "θgF" denotes a relative partial dispersion with respect to g-line light and F-line light, and wherein an angle (θ) to an optical axis of an off-axis principal ray incident on a lens surface of the first negative lens facing the object side at an arbitrary image height y and a focal length (f) of the entire optical system satisfy the following condition:

$$1.8 \leq (y/f \sin(\theta/2)) \leq 2.1.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 10A, 10B, and 10C are aberration charts of the optical system according to the fifth exemplary embodiment of the present invention at the wide-angle end, a middle focal length, and a telephoto end, respectively.

FIGS. 12A, 12B, and 12C are aberration charts of the optical system according to the sixth exemplary embodiment of the present invention at the wide-angle end, a middle focal length, and a telephoto end, respectively.

DESCRIPTION OF THE EMBODIMENTS

Figure 1:
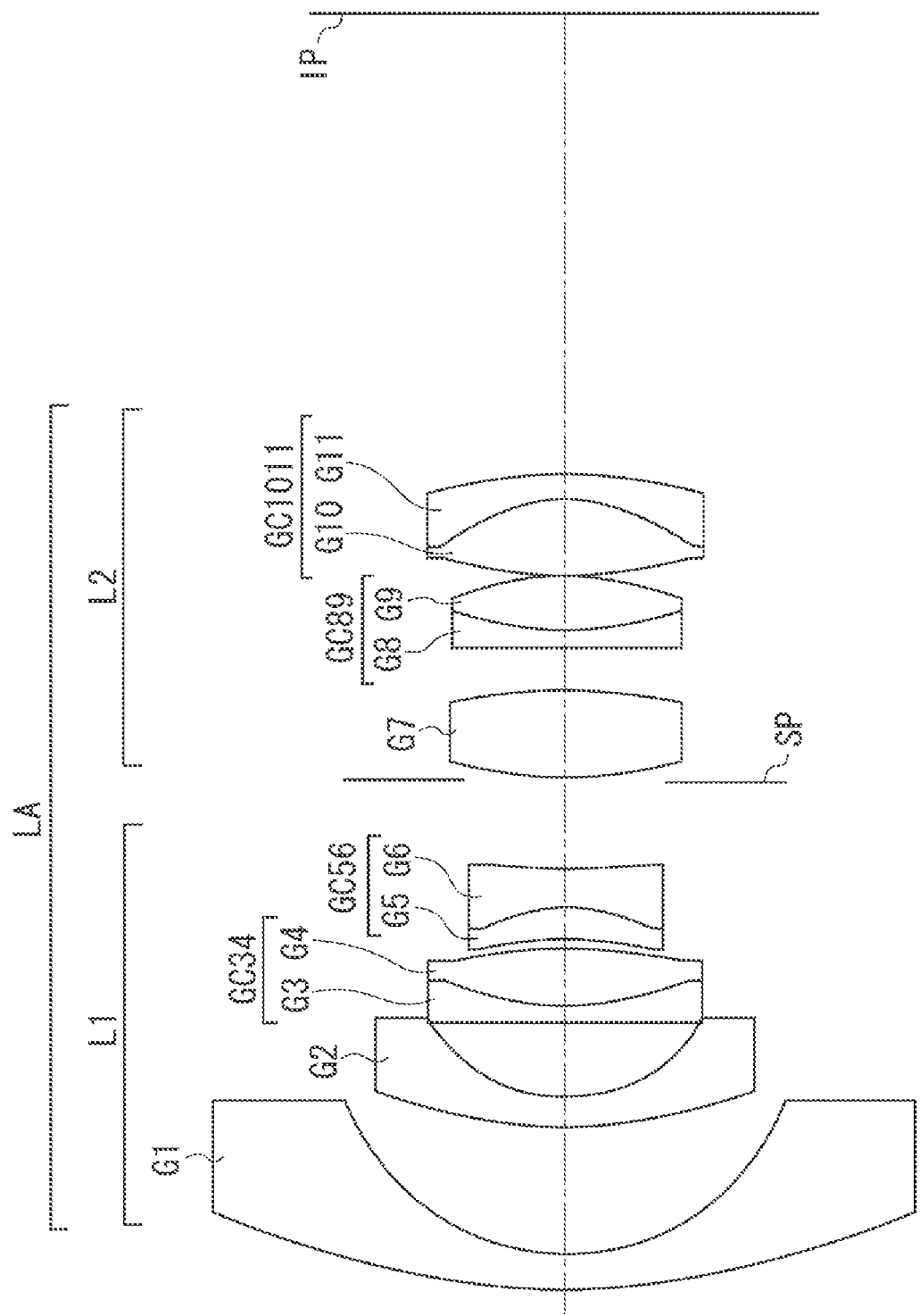
FIG. 1 is a lens cross section of an optical system according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

Now, an optical system and an image pickup apparatus having the optical system of the present invention will be described below.

The optical system according to an exemplary embodiment of the present invention is a lens having a wide angle of view and a single focal length or a zoom lens having a zooming function, including, in order from an object side to an image side, a first lens unit having a negative refractive power, a stop (an aperture stop or an F-number defining stop), and a second lens unit having a positive refractive power.

Figure 2:
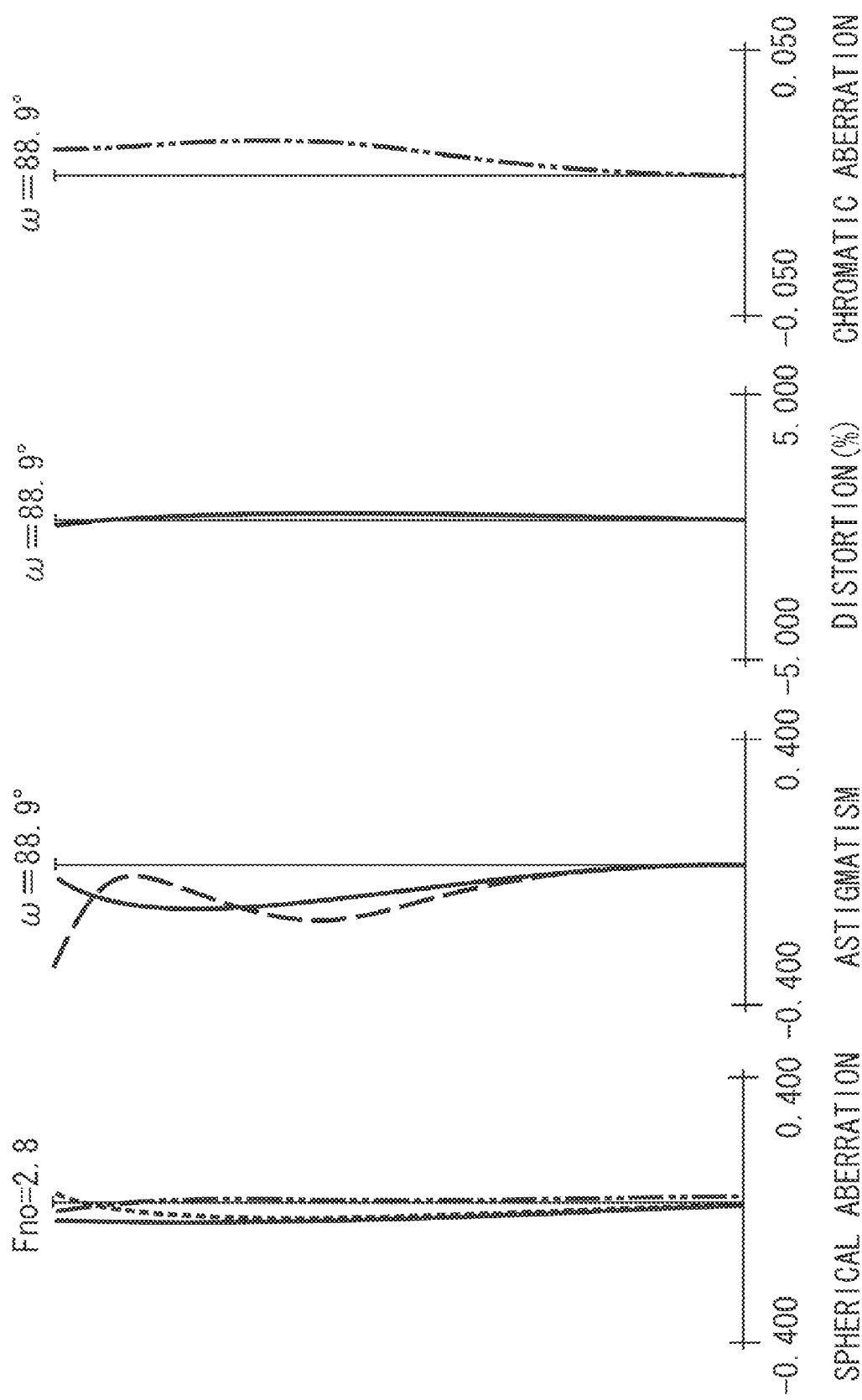
FIG. 2 is an aberration chart of the optical system according to the first exemplary embodiment of the present invention at an infinite object distance.
Figure 3:
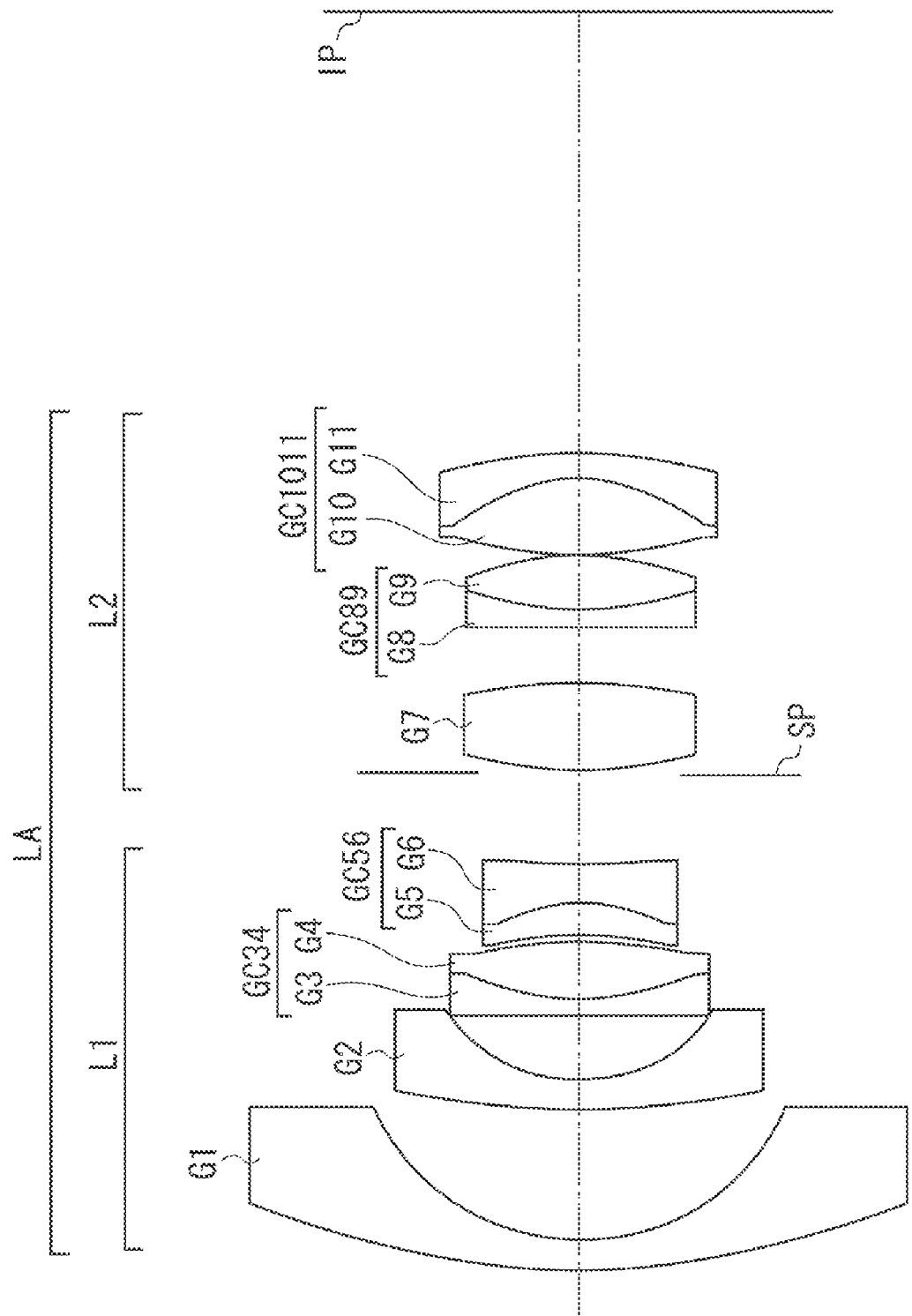
FIG. 3 is a lens cross section of an optical system according to a second exemplary embodiment of the present invention.
Figure 4:
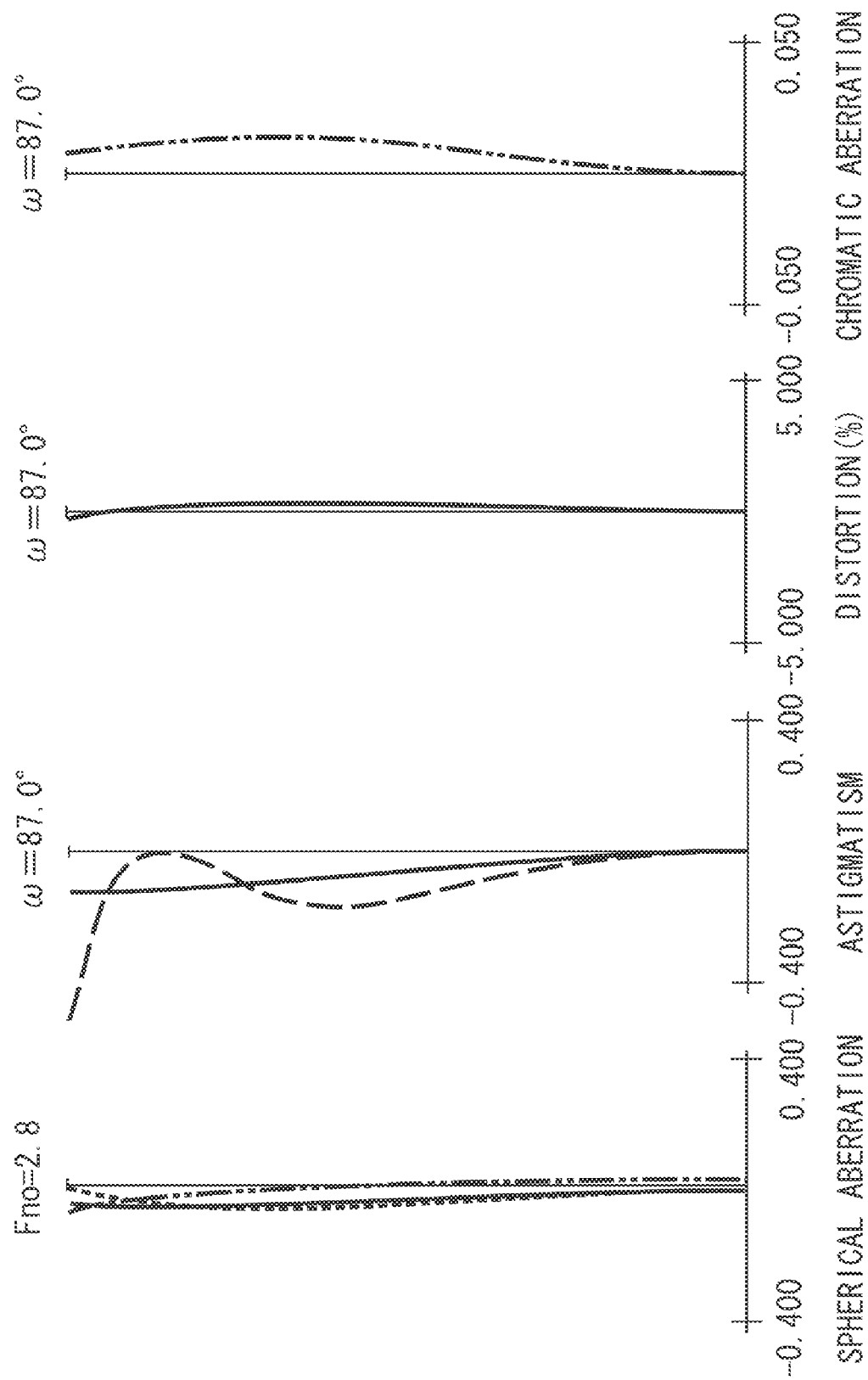
FIG. 4 is an aberration chart of the optical system according to the second exemplary embodiment of the present invention at an infinite object distance.

FIG. 1 is a lens cross section of an optical system according to a first exemplary embodiment of the present invention. FIG. 2 is an aberration chart of the optical system according to the first exemplary embodiment at an infinite object distance. FIG. 3 is a lens cross section of an optical system according to a second exemplary embodiment of the present invention. FIG. 4 is an aberration chart of the optical system according to the second exemplary embodiment at an infinite object distance.

Figure 5:
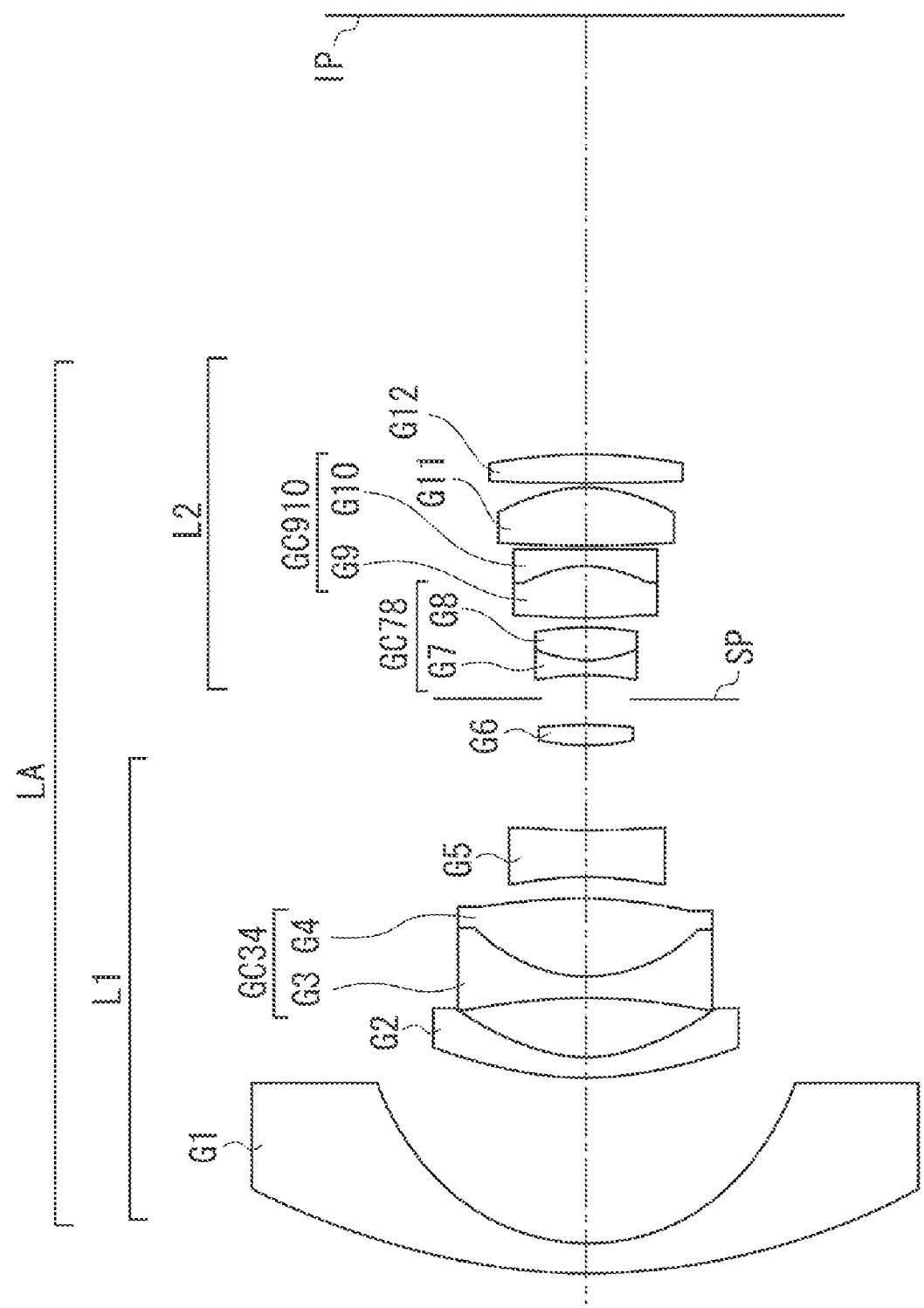
FIG. 5 is a lens cross section of an optical system according to a third exemplary embodiment of the present invention.
Figure 6:
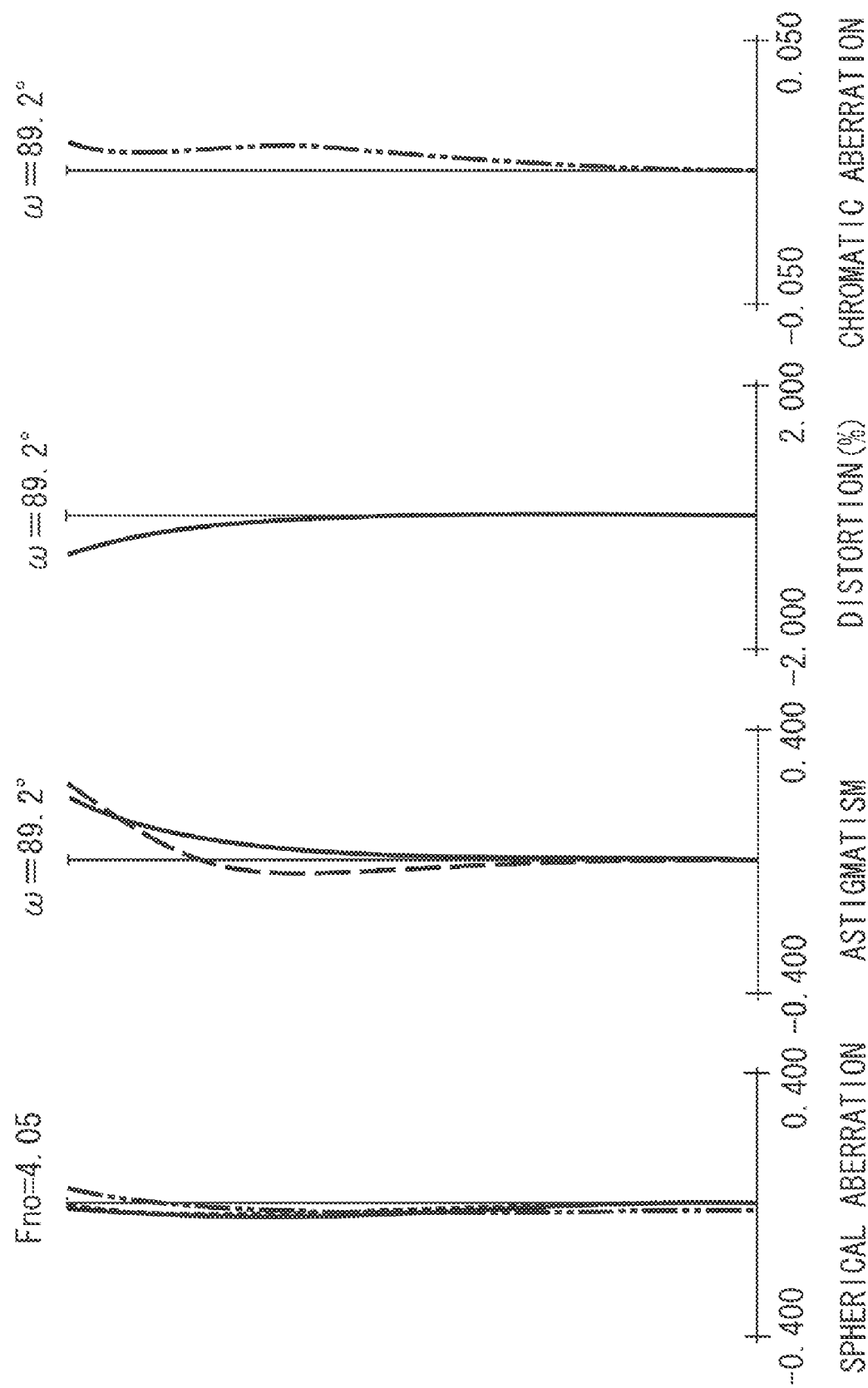
FIG. 6 is an aberration chart of the optical system according to the third exemplary embodiment of the present invention at an infinite object distance.
Figure 7:
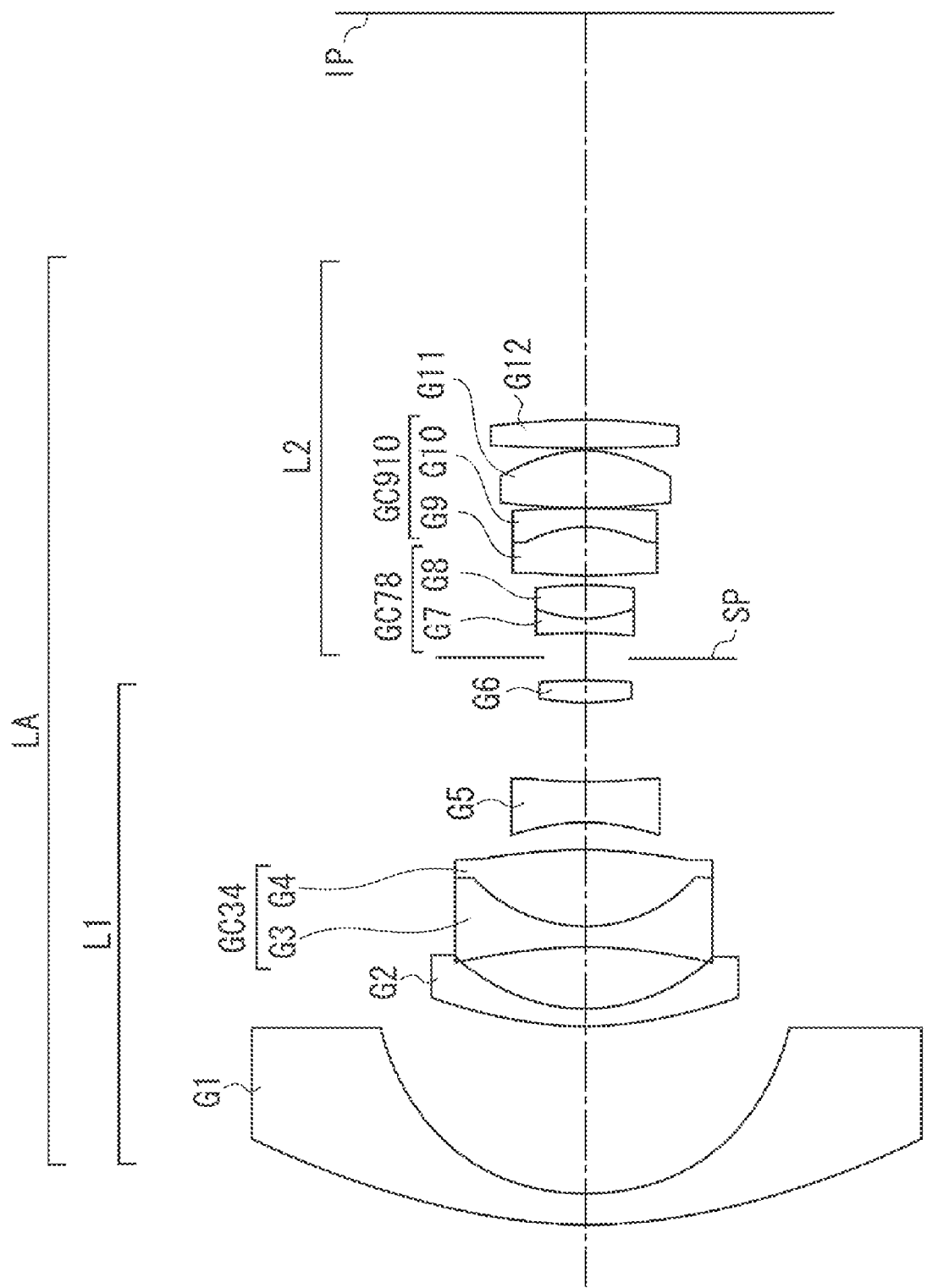
FIG. 7 is a lens cross section of an optical system according to a fourth exemplary embodiment of the present invention.
Figure 8:
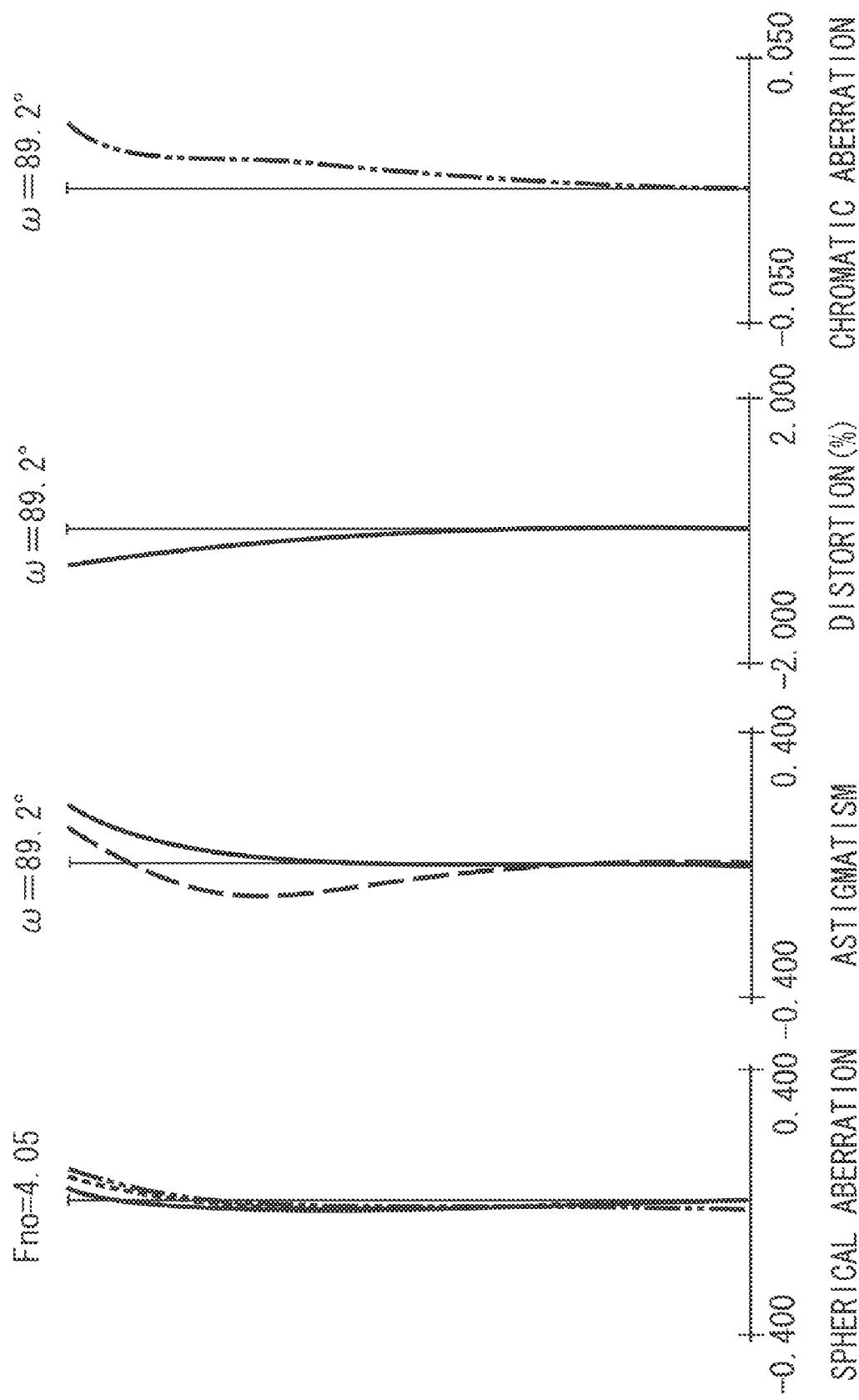
FIG. 8 is an aberration chart of the optical system according to the fourth exemplary embodiment of the present invention at an infinite object distance.

FIG. 5 is a lens cross section of an optical system according to a third exemplary embodiment of the present invention. FIG. 6 is an aberration chart of the optical system according to the third exemplary embodiment at an infinite object distance. FIG. 7 is a lens cross section of an optical system according to a fourth exemplary embodiment of the present invention. FIG. 8 is an aberration chart of the optical system according to the fourth exemplary embodiment at an infinite object distance.

Figure 9:
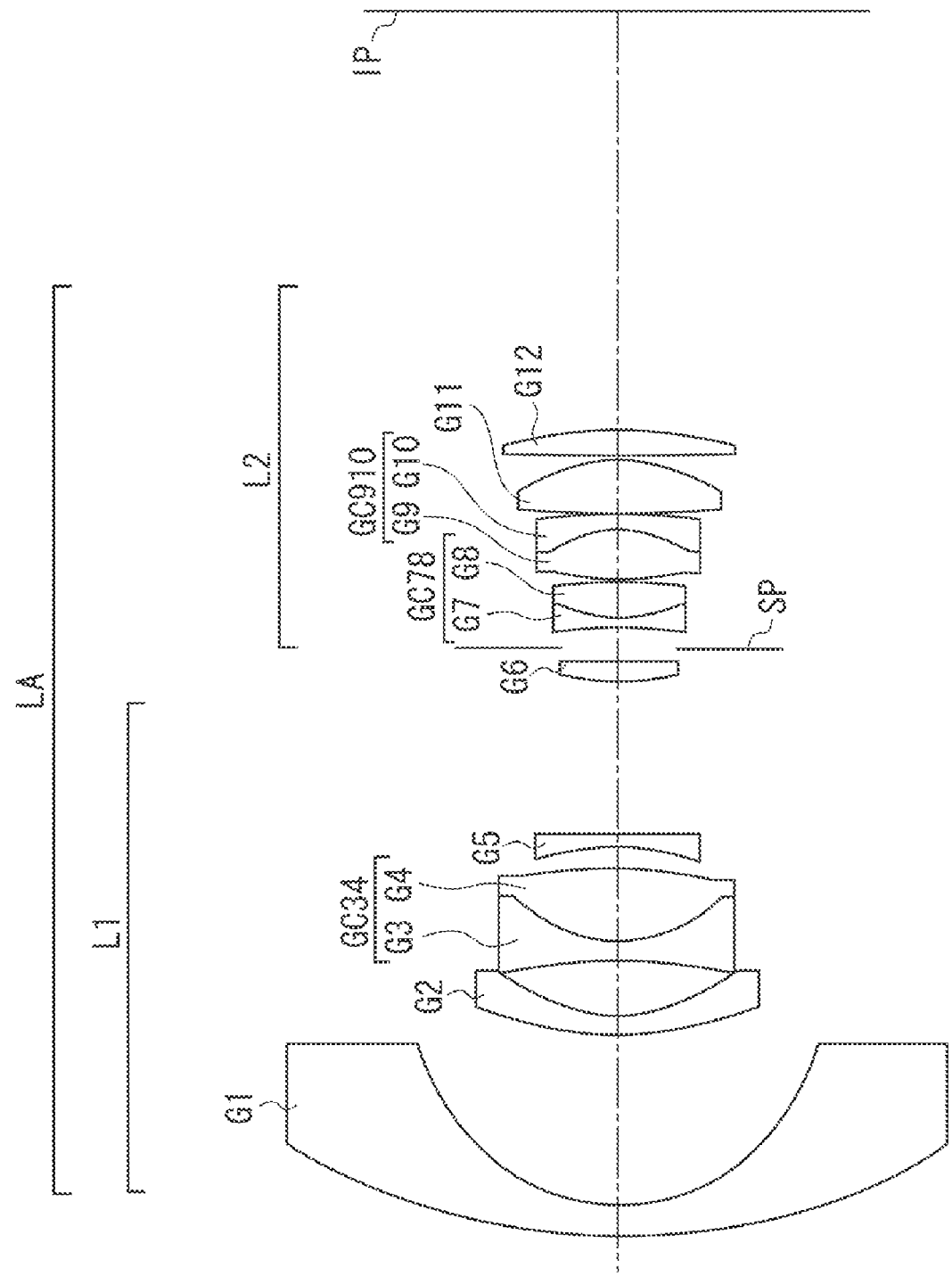
FIG. 9 is a lens cross section of an optical system according to a fifth exemplary embodiment of the present invention at a wide-angle end.
Figure 10A:
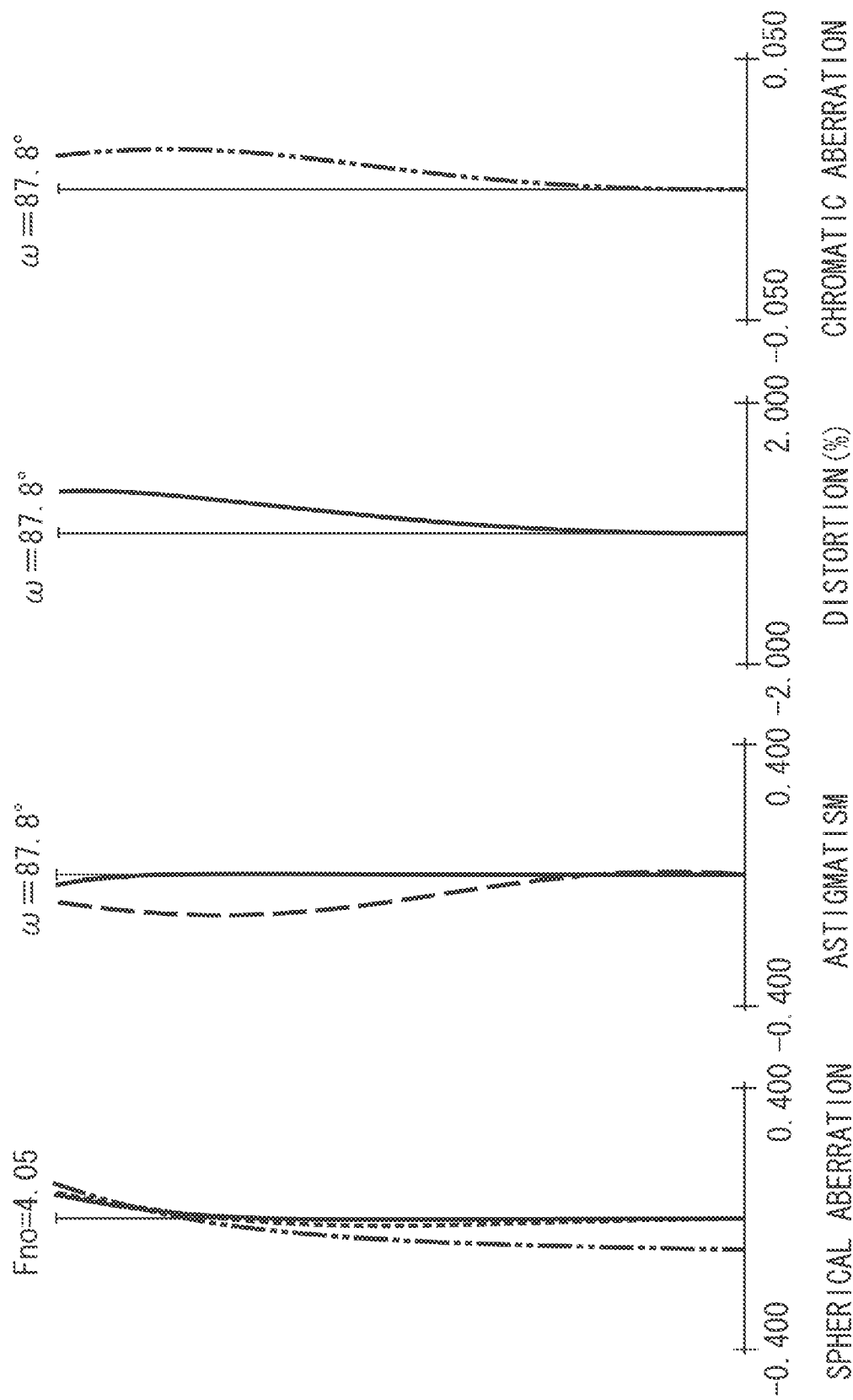

FIG. 9 is a lens cross section of an optical system according to a fifth exemplary embodiment of the present invention at a wide-angle end (a short focal length end). FIGS. 10A through 10C are aberration charts of the optical system according to the fifth exemplary embodiment of the present invention at the wide-angle end, a middle focal length, and a telephoto end (a long focal length end).

Figure 11:
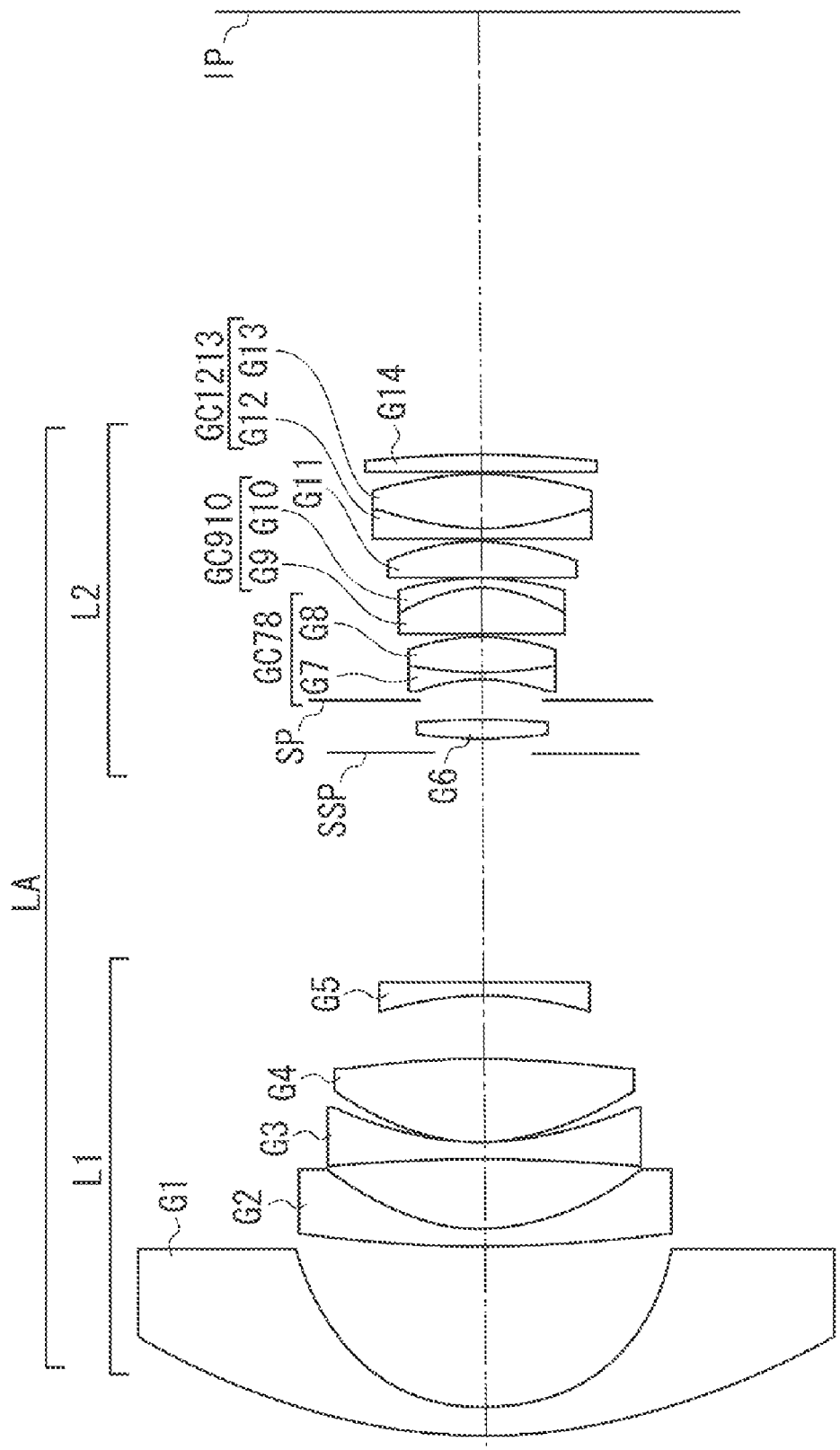
FIG. 11 is a lens cross section of an optical system according to a sixth exemplary embodiment of the present invention at a wide-angle end.
Figure 13:
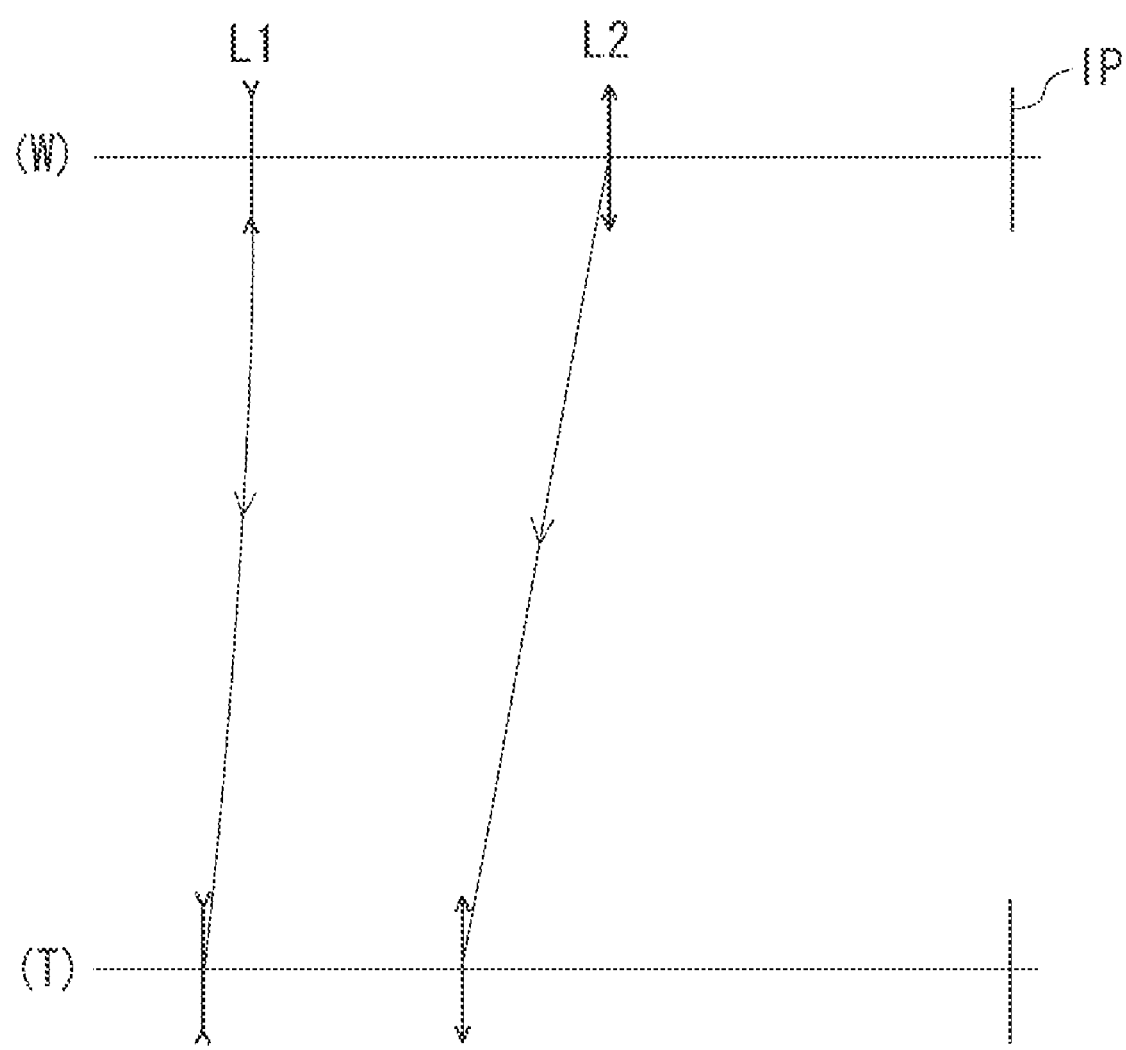
FIG. 13 illustrates an example of a locus of movement of each lens unit of the optical systems according to the fifth and the sixth exemplary embodiments executed during zooming.
Figure 14:
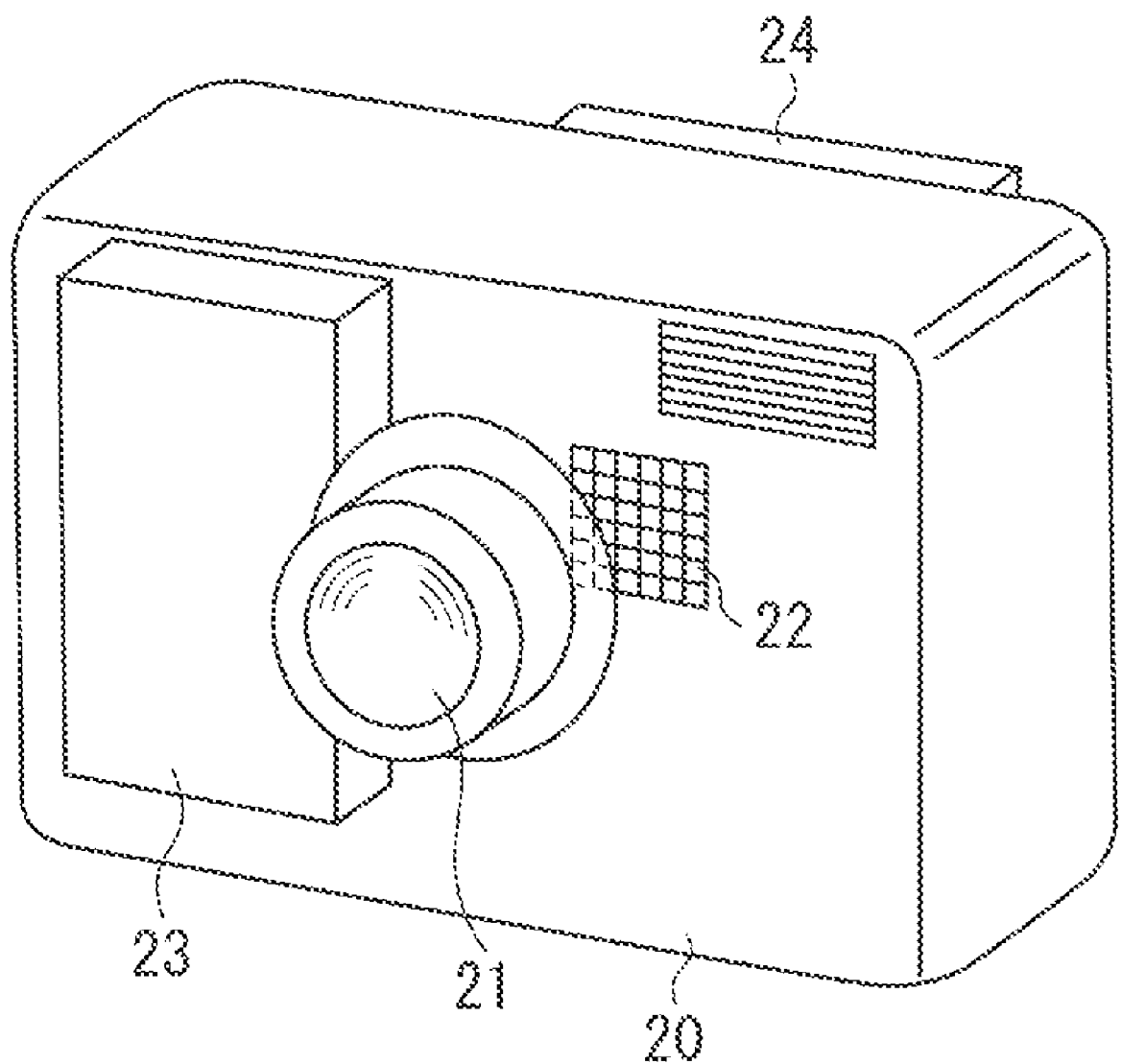
FIG. 14 illustrates exemplary components of an image pickup apparatus according to an exemplary embodiment of the present invention.

FIG. 11 is a lens cross section of an optical system according to a sixth exemplary embodiment of the present invention at the wide-angle end. FIGS. 12A through 12C are aberration charts of the optical system according to the sixth exemplary embodiment of the present invention at the wide-angle end, a middle focal length, and the telephoto end. FIG. 13 illustrates an example of a locus of movement of each lens unit of the optical systems according to the fifth and the sixth exemplary embodiments executed during zooming. FIG. 14 illustrates exemplary components of a digital camera (image pickup apparatus) having the optical system according to at least one of the first through sixth embodiments of the present invention.

The optical system according to each exemplary embodiment is a photographic lens system used in an image pickup apparatus, such as a digital camera or a video camera. In each of the diagrams showing a cross section of the optical system (FIGS. 1, 3, 5, 7, 9, and 11), the enlargement conjugate side (the object side (the front side)) is shown at a left-hand portion of the drawing, and the reduction conjugate side (the image side (the back side)) is shown at a right-hand portion thereof. As used herein, the side of a lens where an object to be imaged is located is called the object side or front side of the lens; and the side of the lens where the image of the object is formed is called the image side or back side of the lens.

If the optical system according to each exemplary embodiment of the present invention is used as a projection lens for a projector, in each of the diagrams showing a cross section of the optical system (FIGS. 1, 3, 5, 7, 9, and 11), the side of a screen is shown at the left-hand portion of the drawing, and the side of an image to be projected is shown at the right-hand portion thereof. In each of the diagrams showing a cross section of the optical system (FIGS. 1, 3, 5, 7, 9, and 11), "LA" denotes the optical system.

The optical system illustrated in each of FIGS. 1, 3, 5, and 7 is a lens system having a single focal length and a wide angle of view (i.e., a fisheye lens (a fisheye optical system)). In each of the diagrams showing a cross section of the lens system (FIGS. 1, 3, 5, and 7), "L1" denotes a first lens unit having a negative refractive power. "SP" denotes an aperture stop. "L2" denotes a second lens unit having a positive refractive power.

The optical system illustrated in each of FIGS. 9 and 11 is a zoom lens having a wide angle of view (i.e., a fisheye zoom lens). The zoom lens LA illustrated in each of FIGS. 9 and 11 includes a first lens unit L1 having a negative refractive power (optical power=an inverse of the focal length), an aperture stop SP, and a second lens unit L2 having a positive refractive power. During zooming from the wide-angle end to the telephoto end, the first lens unit L1 and the second lens unit L2 move towards the object side in such a way that the distance between the first lens unit L1 and the second lens unit L2 becomes narrower, as illustrated in FIG. 13.

In each lens cross section (FIGS. 1, 3, 5, 7, 9, and 11), "IP" denotes an image plane. The image plane IP is, when the zoom lens according to an exemplary embodiment of the present invention is used as a photographic optical system of a video camera or a digital still camera, equivalent to the position of a solid-state image sensor (photoelectric conversion element), such as a charge-coupled device (CCD) sensor or a complementary metal-oxide semiconductor (CMOS) sensor. The image plane IP is, when the optical system is used as a photographic optical system of a silver-halide film camera, equivalent to the position of a film (photosensitive) surface.

In each aberration chart (FIGS. 2, 4, 6, 8, 10A through 10C, and 12A through 12C), spherical aberration, astigmatism, distortion, and chromatic aberration of magnification are illustrated in this order from left to right (in the drawings). In a portion of each of the aberration charts (FIGS. 2, 4, 6, 8, 10A through 10C, and 12A through 12C) illustrating spherical aberration and chromatic aberration of magnification, a solid line indicates d-line light (wavelength: 587.6 nm), alternate long and short dashed lines indicate C-line light (wavelength: 656.3 nm), a rough broken line indicates F-line light (wavelength: 486.1 nm), and a fine broken line indicates g-line light (wavelength: 435.8 nm). In a portion of each of the aberration charts (FIGS. 2, 4, 6, 8, 10A through 10C, and 12A through 12C) illustrating astigmatism, a solid line indicates a sagittal image plane ($\Delta S$) with respect to d-line light while a broken line indicates a meridional image plane ($\Delta M$) with respect to d-line light. A portion of each of the aberration charts (FIGS. 2, 4, 6, 8, 10A through 10C, and 12A through 12C) illustrating distortion illustrates distortion with respect to d-line light. "Fno" denotes an F-number and "$\omega$" denotes a half angle of view.

In the optical system LA according to an exemplary embodiment of the present invention, the refractive index and the Abbe number of a material of a first negative lens, the shape of the first negative lens, and a material of a lens included in the first lens unit L1 and the second lens unit L2 are appropriately set. The first negative lens is located at a position closest to the object side, has a meniscus shape, and has a negative refractive power.

In the optical system LA according to an exemplary embodiment of the present invention, it is useful to use a high anomalous dispersion material as a material of a positive lens in order to effectively correct axial chromatic aberration and chromatic aberration of magnification. If the negative refractive power of the first lens unit L1 is high, the difference between the height of incidence of an axial light flux and the height of incidence of an off-axis light flux may become large. Accordingly, the optical system LA according to an exemplary embodiment of the present invention uses the high anomalous dispersion material for the negative lens included in the first lens unit L1 to effectively correct chromatic aberration of magnification.

If the negative refractive power of the first lens unit L1 is high, the difference between the height of incidence of an axial light flux and the height of incidence of an off-axis light flux may become large. Accordingly, the optical system LA uses a high anomalous material for the negative lens included in the first lens unit L1 to effectively correct chromatic aberration of magnification.

In the fisheye optical system, unlike a normal lens having a wide angle of view, it is necessary to provide a lens located at a position closest to the object side with high negative power (negative refractive power) because it is necessary to generate negative distortion. As a result, a large amount of chromatic aberration may occur in the fisheye optical system. Therefore, in order to reduce the amount of chromatic aberration, it may be useful to use a lens made of a low dispersion material. However, if a material of a high refractive index and low dispersion is used as a material of the negative lens, it becomes difficult to correct the secondary spectrum. Accordingly, in most cases, a conventional optical system uses a lens made of a material of low refractive index and low dispersion.

In contrast, in each exemplary embodiment of the present invention, a material having high anomalous dispersion is used for the negative lens included in the first lens unit L1 to effectively reduce the amount of chromatic aberration of magnification. In addition, each exemplary embodiment of the present invention uses a material having a high refractive index and low dispersion for the lens located at a position closest to the object side to improve the easiness of working the lens into an appropriate shape.

In each exemplary embodiment, the first lens unit L1 includes a first negative lens G1 having a meniscus shape and a negative refractive power at a position closest to the object side. In addition, the first lens unit L1 includes a negative lens Gn having a negative refractive power at a position closer to the image side than the first negative lens G1. The second lens unit L2 includes a positive lens Gp having a positive refractive power.

Let "vd" be an Abbe number of the lens material and "θgF" be a relative partial dispersion with respect to g-line light and F-line light. Then, the material of each of the negative lens Gn and the positive lens Gp can satisfy the following condition (1):

$$\theta gF-(-0.001682\cdot vd+0.6438)\leq 0.01 \quad (1)$$

In addition, an angle (θ) to an optical axis of an off-axis principal ray incident on a lens surface of the first negative lens G1 facing the object side at an arbitrary image height y and a focal length (f) of the entire optical system, which indicates the focal length at the wide-angle end or at the telephoto end if the optical system has a zooming function, can satisfy the following condition (2):

$$1.8\leq (y/f\sin(\theta/2))\leq 2.1 \quad (2)$$

The Abbe number (vd) and the relative partial dispersion (θgF) are defined by the following expressions:

$$vd=(Nd-1)/(NF-NC)$$

$$\theta gF=(Ng-NF)/(NF-NC)$$

where "Ng" denotes the refractive index with respect to g-line light (wavelength: 435.8 nm), "Nd" denotes the refractive index with respect to d-line light (wavelength: 587.6 nm), "NF" denotes the refractive index with respect to F-line light (wavelength: 486.1 nm), and "NC" denotes the refractive index with respect to C-line light (wavelength: 656.3 nm).

The condition (1) provides a condition for a material of the negative lens located in front of the stop and a material of the positive lens located behind the stop. If the lower limit of the condition (1) is exceeded, then it becomes difficult to correct chromatic aberration (particularly, chromatic aberration of magnification). In addition, if a low dispersion material having a low refractive index is used, the lens may have a shape difficult to work into to achieve a predetermined refractive power.

The condition (2) provides a condition for distortion necessary when the optical system is used as a fisheye lens (fisheye optical system). If the upper limit of the condition (2) is exceeded, then it becomes difficult to achieve an angle of view wide enough for a fisheye optical system. On the other hand, if the lower limit of the condition (2) is exceeded, then the refractive power of the first lens unit L1 and the second lens unit L2 becomes very high because too large an amount of distortion is generated. In this case, it becomes difficult to correct various aberrations, particularly, chromatic aberration of magnification.

If the optical system is a zoom lens, a focal length (fa) of the entire system at the wide-angle end or the telephoto end can satisfy the following condition (2x):

$$y\leq 1500\cdot fa\cdot\sin(\theta/2)/(750-2\cdot fa\cdot\sin(\theta/2)) \quad (2x)$$

The condition (2x) provides a condition for effectively generating distortion necessary for the fisheye optical system. If the upper limit or the lower limit of the condition (2x) is exceeded, then it becomes difficult to effectively correcting chromatic aberration of magnification while generating distortion.

In each exemplary embodiment, the range of the values in the conditions (1) and (2) can be altered as follows:

$$0.015\leq \theta gF-(-0.001682\cdot vd+0.6438)\leq 0.055 \quad (1a)$$

$$1.95\leq (y/f\sin(\theta/2))\leq 2.1 \quad (2a)$$

It is further useful if each exemplary embodiment satisfies at least one of the following conditions to achieve an effect of each corresponding condition. More specifically, a focal length of the first negative lens G1 (f1), the focal length of the entire optical system (f), which is a focal length at the wide-angle end or the telephoto end if the optical system has a zooming function, a focal length of the negative lens Gn (fex), radiuses of curvature of surfaces of the first negative lens G1 on the object side and on the image side, respectively (r1, r2), and a shape factor of the first negative lens G1 (SH1 (=(r1−r2)/(r1+r2)), a refractive index of the material of the first negative lens G1 (Nd), an Abbe number of the material of the first negative lens G1 (vd), an Abbe number of a material of a negative lens GCn (vdn), a relative partial dispersion of the material of the negative lens GCn with respect to g-line light and F-line light (θgFn), an Abbe number of a material of a positive lens GCp (vdp), and a relative partial dispersion of the material of the positive lens GCp with respect to g-line light and F-line light (θgFp) satisfy at least one of the following conditions:

$$-4.5\leq f1/f\leq -1.8 \quad (3)$$

$$0.3\leq fex/f1\leq 2.1 \quad (4)$$

$$0.4\leq SH1\leq 1.0 \quad (5)$$

$$1.63\leq Nd\leq 1.89 \quad (6)$$

$$40\leq vd\leq 61 \quad (7)$$

$$\theta gFn-(-0.001682\cdot vdn+0.6438)\geq 0.01 \quad (8)$$

$$\theta gFp\leq -0.001682\cdot vdp+0.6438 \quad (9)$$

where the first lens unit L1 includes a cemented lens including the negative lens GCn having a negative refractive power and the positive lens GCp having a positive refractive power.

The condition (3) provides a condition for the refractive power of the first negative lens G1 having a meniscus shape and a negative refractive power, which is located at a position closest to the object side. If the upper limit of the condition (3) is exceeded, then the amount the refractive power of the first negative lens G1 becomes very large and a large amount of chromatic aberration of magnification and curvature of field may occur. On the other hand, if the lower limit of the condition (3) is exceeded, then it becomes difficult to generate distortion of an amount necessary for the fisheye optical system.

The condition (4) provides a condition for the refractive power of the negative lens Gn included in the first lens unit L1 that satisfies the condition (1). If the upper limit of the condition (4) is exceeded, then the chromatic aberration of magnification cannot be effectively corrected. On the other hand, if the lower limit of the condition (4) is exceeded, then the refractive power of the negative lens Gn may become too intense. In this case, a large amount of curvature of field and astigmatism may occur.

The condition (5) provides a condition for the shape factor (the lens shape) of the first negative lens G1 included in the first lens unit L1. If the upper limit of the condition (5) is exceeded, then light cannot be incident on the surface of the first negative lens G1 on the object side in a direction normal to the optical axis (equivalent to the half angle of view of about 90°) because the surface of the first negative lens G1 on the object side becomes concave against the object side. Accordingly, in this case, it becomes difficult to achieve the wide angle of view of about 180°, which is necessary to implement the function of a fisheye optical system.

On the other hand, if the lower limit of the condition (5) is exceeded, then the curvature of the surface of the first negative lens G1 on the image side may become very high. In this case, a large amount of off-axis astigmatism and off-axis curvature of field may occur. In addition, because the relationship between the radius of curvature and the effective diameter on the surface of the first negative lens G1 on the image side may become close to the relationship between them on a lens having a semisphere shape. Accordingly, in this case, it becomes difficult to manufacture the lens The condition (6) provides a condition for the refractive index of the material of the first negative lens G1. If the upper limit of the condition (6) is exceeded, then the dispersion of the material may become very high based on the relationship between the refractive index and the Abbe number of an actually used material. In this case, it becomes difficult to effectively correct chromatic aberration of magnification. On the other hand, if the lower limit of the condition (6) is exceeded, then it becomes difficult to work the first negative lens G1 into an appropriate shape for achieving a refractive power appropriate for generating distortion.

The condition (7) provides a condition for the Abbe number of the material of the first negative lens G1. If the upper limit of the condition (7) is exceeded, then the refractive index of the material becomes low based on the relationship between the refractive index and the Abbe number of an actually used material. In this case, it becomes difficult to work the first negative lens G1 into an appropriate shape for achieving a refractive power appropriate for generating distortion. On the other hand, if the lower limit of the condition (7) is exceeded, then the dispersion of the material of the first negative lens G1 becomes very high. In this case, it becomes difficult to effectively correct chromatic aberration of magnification.

The condition (8) provides a condition for the material of the negative lens GCn included in the cemented lens of the first lens unit L1. If the lower limit of the condition (8) is exceeded, then it becomes difficult to effectively correct chromatic aberration of magnification. Accordingly, it is useful to satisfy the condition (8).

The condition (9) provides a condition for the Abbe number and the relative partial dispersion of the material of the positive lens GCp included in the cemented lens. The technical significance of the condition (9) is similar to that of the above-described condition (8).

It is further useful if the range of the values in the conditions (3) through (8) are altered as follows:

$$-4.0 \leq f1/f \leq -2.0 \quad (3a)$$

$$0.5 \leq fex/f1 \leq 2.0 \quad (4a)$$

$$0.45 \leq SH1 \leq 0.80 \quad (5a)$$

$$1.70 \leq Nd \leq 1.89 \quad (6a)$$

$$40 \leq vd \leq 50 \quad (7a)$$

$$\theta gFn - (-0.001682 \cdot vdn + 0.6438) \geq 0.015 \quad (8a)$$

Most fisheye optical systems generally use an all-unit movement method or a single-unit movement method. In order to execute quick auto-focusing, an inner focusing method, which uses a small-size light-weight lens unit as a focusing lens unit, can be used.

If a fisheye optical system is used, the photographer may often shoot an image of an object with a very short object distance. Accordingly, it is useful if the inner focusing method is employed because the front lens is fixed in the inner focusing method, which can prevent dusts or damages on the lens.

Accordingly, each exemplary embodiment executes focusing by moving a part of the first lens unit L1 other than the first negative lens. In addition, it is useful if the positive lens of the second lens unit L2 located closest to the image side has an aspheric shape to generate negative distortion. If the power of the positive lens of the second lens unit L2 located closest to the image side is too high, the amount of spherical aberration and axial chromatic aberration may increase. Accordingly, in order to reduce the amount of spherical aberration and axial chromatic aberration, it is useful if the positive lens of the second lens unit L2 located closest to the image side has an aspheric shape, with which shape the positive power of the lens may become more intense from the center of the lens towards the periphery thereof.

An exemplary configuration of each exemplary embodiment will be described in detail below. The optical system LA according to the first exemplary embodiment includes, in order from the object side to the image side, the first lens unit L1 having a negative refractive power, the aperture stop SP, and the second lens unit L2 having a positive refractive power.

The first lens unit L1 includes, in order from the object side to the image side, the first negative lens G1 having a meniscus shape and whose lens surface on the object side has a convex shape towards the object side, and a second negative lens G2 having a meniscus shape and whose surface on the object side has a convex shape towards the object side. In addition, the first lens unit L1 includes a cemented lens GC34, which includes a third negative lens G3 and a fourth positive lens G4 cemented to each other, and a cemented lens GC56, which includes a fifth positive lens G5 and a sixth negative lens G6 cemented to each other.

The second lens unit L2 includes, in order from the object side to the image side, a seventh positive lens G7, a cemented lens GC89 including an eighth negative lens G8 and a ninth positive lens G9 cemented to each other, and a cemented lens GC1011 including a tenth positive lens G10 and an eleventh negative lens G11 cemented to each other.

In the present exemplary embodiment, focusing is executed by moving a part of the first lens unit L1 in the direction of the optical axis. Furthermore, the present exemplary embodiment uses a glass having high dispersion for the third negative lens G3 (the negative lens Gn), the ninth positive lens G9 (the positive lens Gp1), and the tenth positive lens G10 (the positive lens Gp2) to effectively correct chromatic aberration of magnification and axial chromatic aberration.

In addition, in the present exemplary embodiment, the glass having high anomalous dispersion is effectively located at an appropriate position on the optical path. Accordingly, although this configuration is not advantageous in increasing an effect of correcting chromatic aberration of magnification, a lens made of a material having high refractive index and low dispersion can be used as the lens located closest to the object side, which has a shape easy to be worked into. In addition, the third negative lens G3 is equivalent to the negative lens GCn and the fourth positive lens G4 is equivalent to the positive lens GCp.

For the lens configuration of the second exemplary embodiment of the present invention, the arrangement of the lenses is the same as that of the first exemplary embodiment and the same refractive power as that provided in the first exemplary embodiment is provided to each lens although some of the materials of the lenses are different from those used in the first exemplary embodiment.

In the optical system LA according to the third exemplary embodiment, the first lens unit L1 includes, in order from the object side to the image side, the first negative lens G1 having a meniscus shape and whose lens surface on the object side has a convex shape towards the object side, and a second negative lens G2 having a meniscus shape and whose surface on the object side has a convex shape towards the object side. In addition, the first lens unit L1 includes a cemented lens GC34, which includes a third negative lens G3 and a fourth positive lens G4 cemented to each other, a fifth negative lens G5, and a sixth positive lens G6.

The second lens unit L2 includes, in order from the object side to the image side, a cemented lens GC78, which includes a seventh negative lens G7 and an eighth positive lens G8 cemented to each other, a cemented lens GC910, which includes a ninth positive lens G9 and a tenth negative lens G10 cemented to each other, an eleventh positive lens G11, and a twelfth positive lens G12. In the present exemplary embodiment, focusing is executed by moving a part of the first lens unit L1 in the direction of the optical axis. In the present exemplary embodiment, a glass having high anomalous dispersion is used as the third negative lens G3 (the negative lens Gn), the ninth positive lens G9 (the positive lens Gp1), and the eleventh positive lens G11 (the positive lens Gp2) to effectively suppress chromatic aberration of magnification and axial chromatic aberration.

In addition, in the present exemplary embodiment, the glass having high anomalous dispersion is effectively located at an appropriate position on the optical path. Accordingly, although this configuration is not advantageous in increasing an effect of correcting chromatic aberration of magnification, a lens made of a material having high refractive index and low dispersion can be used as the lens located closest to the object side, which has a shape easy to be worked into. In addition, the third negative lens G3 is equivalent to the negative lens GCn and the fourth positive lens G4 is equivalent to the positive lens GCp.

For the lens configuration of the fourth exemplary embodiment of the present invention, the arrangement of the lenses is the same as that of the third exemplary embodiment and the same refractive power as that provided in the third exemplary embodiment is provided to each lens although some of the materials of the lenses are different from those used in the third exemplary embodiment.

The optical system LA of the fifth exemplary embodiment is a zoom lens including two lens units, i.e., the first lens unit L1 having a negative refractive power and the second lens unit L2 having a having a positive refractive power and having the zooming function. In the optical system LA according to the fifth exemplary embodiment, the first lens unit L1 includes, in order from the object side to the image side, the first negative lens G1 having a meniscus shape and whose lens surface on the object side has a convex shape towards the object side, and a second negative lens G2 having a meniscus shape and whose surface on the object side has a convex shape towards the object side. In addition, the first lens unit L1 includes a cemented lens GC34, which includes a third negative lens G3 and a fourth positive lens G4 cemented to each other, and a fifth negative lens G5.

The second lens unit L2 includes, in order from the object side to the image side, a sixth positive lens G6, a cemented lens GC78, which includes a seventh negative lens G7 and an eighth positive lens G8 cemented to each other, and a cemented lens GC910, which includes a ninth positive lens G9 and a tenth negative lens G10 cemented to each other, an eleventh positive lens G11, and a twelfth positive lens G12. During zooming from the wide-angle end to the telephoto end, both the first lens unit L1 and the second lens unit L2 move towards the object side in such a way that the distance between the first lens unit L1 and the second lens unit L2 becomes narrower, as illustrated in FIG. 13.

In the present exemplary embodiment, focusing is executed by moving a part of the first lens unit L1 in the direction of the optical axis. Furthermore, the present exemplary embodiment uses a glass having high anomalous dispersion for the third negative lens G3 (the negative lens GCn), the ninth positive lens G9 (the positive lens GCp1), and the eleventh positive lens G11 (the positive lens GCp2) to effectively correct chromatic aberration of magnification and axial chromatic aberration by using each lens unit. With the above-described configuration, the present exemplary embodiment suppresses variation of chromatic aberration of magnification and axial chromatic aberration during zooming.

In addition, in the present exemplary embodiment, the glass having high anomalous dispersion is effectively located at an appropriate position on the optical path. Accordingly, although this configuration is not advantageous in increasing an effect of correcting chromatic aberration of magnification, a lens made of a material having high refractive index and low dispersion can be used as the lens located closest to the object side, which has a shape easy to be worked into. In addition, the third negative lens G3 is equivalent to the negative lens GCn and the fourth positive lens G4 is equivalent to the positive lens GCp.

The optical system LA of the sixth exemplary embodiment is a zoom lens including two lens units, i.e., the first lens unit L1 having a negative refractive power and the second lens unit L2 having a having a positive refractive power and having the zooming function. In the optical system LA, according to the fifth exemplary embodiment, the first lens unit L1 includes, in order from the object side to the image side, the first negative lens G1 having a meniscus shape and whose lens surface on the object side has a convex shape towards the object side, and a second negative lens G2 having a meniscus shape and whose surface on the object side has a convex shape towards the object side. In addition, the first lens unit L1 includes a third negative lens G3, a fourth positive lens G4, and a fifth negative lens G5.

The second lens unit L2 includes, in order from the object side to the image side, a sub stop SSP, a sixth positive lens G6, a stop SP, a cemented lens GC78, which includes a seventh negative lens G7 and an eighth positive lens G8 cemented to each other, and a cemented lens GC910, which includes a ninth positive lens G9 and a tenth negative lens G10 cemented to each other, an eleventh positive lens G11, a cemented lens GC1213 including a twelfth negative lens G12 and a thirteenth positive lens G13 cemented to each other, and a fourteenth positive lens G14. During zooming from the wide-angle end to the telephoto end, both the first lens unit L1 and the second lens unit L2 move towards the object side in such way that the distance between the first lens unit L1 and the second lens unit L2 becomes narrower, as illustrated in FIG. 13.

In the present exemplary embodiment, focusing is executed by moving a part of the first lens unit L1 in the direction of the optical axis. Furthermore, the present exemplary embodiment uses a glass having high anomalous dispersion for the second negative lens G2 (the negative lens GCn1), the third negative lens G3 (the negative lens GCn2), and the thirteenth positive lens G13 (the positive lens GCp) to effectively correct chromatic aberration of magnification and axial chromatic aberration by using each lens unit. With the above-described configuration, the present exemplary embodiment suppresses variation of chromatic aberration of magnification and axial chromatic aberration during zooming.

In addition, in the present exemplary embodiment, the glass having high anomalous dispersion is effectively located at an appropriate position on the optical path. Accordingly, although this configuration is not advantageous in increasing an effect of correcting chromatic aberration of magnification, a lens made of a material having high refractive index and low dispersion can be used as the lens located closest to the object side, which has a shape easy to be worked into.

FIG. 13 illustrates an example of a locus of movement of each lens unit of the optical system, which is executed during zooming according to exemplary embodiments of the present invention.

Referring to FIG. 13, the optical system includes, in order from the object side to the image side, the first lens unit L1 having a negative refractive power and the second lens unit L2 having a having a positive refractive power, which are separated from each other at a position on the wide-angle end at which the lens air space between them becomes maximum. During zooming from the wide-angle end to the telephoto end, the first lens unit L1 is moved towards the object side and the second lens unit L2 is moved towards the object side at the same time so that the space between the second lens unit L2 and the first lens unit L1 is monotonously reduced.

In the present exemplary embodiment, if magnification is executed fixedly at the wide-angle end or the telephoto end, the optical system according to the present exemplary embodiment can be used as a fisheye lens having a single focal length.

An exemplary embodiment of a digital still camera (image pickup apparatus) that uses the optical system according to each exemplary embodiment of the present invention as a photographic optical system thereof will be described below with reference to FIG. 14.

Referring to FIG. 14, the digital still camera includes a camera body 20 and a photographic optical system 21. The photographic optical system 21 includes an optical system according to any of the first through the sixth exemplary embodiments described above.

The camera body 20 includes a solid-state image sensor (photoelectric conversion element) 22, such as a CCD sensor or a CMOS sensor, configured to optically receive an object image formed by the photographic optical system 21.

The camera body 20 also includes a memory 23, which records information about the object image that has been photoelectrically converted by the solid-state image sensor 22. In addition, the camera body 20 also includes a viewfinder 24, which includes a liquid crystal display (LCD) panel and via which a user of the camera can observe an object image formed on the solid-state image sensor 22. By applying the optical system according to each exemplary embodiment of the present invention to the digital still camera, the present invention can implement a small-size optical apparatus having a high optical performance. The optical system of the present invention can also be applied as an image projection lens of an image projection apparatus (a projector).

Numerical examples 1 through 6, which respectively correspond to the first through the sixth exemplary embodiments of the present invention, are set forth below. In each of the numerical examples 1 through 6, "ri" denotes a radius of curvature of an i-th optical surface (the i-th surface), "di" denotes an axial space between the i-th surface and the (i+1)-th surface, "ni" and "vi" respectively denote a refractive index and an Abbe number of the material of the i-th optical member with respect to d-line light.

In addition, aspherical surfaces are marked with an asterisk (*) on the side of the surface number, and each of "A4", "A6", "A8", and "A10" denotes an aspheric coefficient for each corresponding order. The aspheric shape is expressed as $$X = \frac{h^2/R}{1+\sqrt{1-(1+k)(h/R)^2}} + A4h^4 + A6h^6 + A8h^8 + A10h^{10}$$

where "X" denotes a displacement from a surface vertex along the optical axis in a position at a height "h" from the optical axis, "R" denotes a paraxial radius of curvature, and "k" denotes a conic constant. Furthermore, the scientific notation "e±XX" for each aspheric coefficient is equivalent to the exponential notation "1×10$^{±XX}$". The relationship between each condition described above and each numerical example is set forth in Table 1.

Numerical Example 1

Unit: mm

Surface Data

| Surface No. | r | d | nd | vd |
|---|---|---|---|---|
| 1 | 64.500 | 2.70 | 1.80400 | 46.6 |
| 2 | 18.500 | 10.03 | | |
| 3 | 38.354 | 2.30 | 1.48749 | 70.2 |
| 4 | 12.731 | 6.06 | | |
| 5 | −270.974 | 1.20 | 1.49700 | 81.5 |
| 6 | 24.738 | 4.68 | 1.80610 | 33.3 |
| 7 | −39.277 | 0.50 | | |
| 8 | −42.382 | 2.72 | 1.53667 | 48.8 |
| 9 | −14.485 | 3.03 | 1.83510 | 42.0 |
| 10 | 72.840 | 6.97 | | |
| 11 | −58.118 | 0.33 | | |
| 12 | 30.793 | 7.10 | 1.63570 | 35.6 |
| 13 | −41.641 | 3.34 | | |
| 14 | −250.083 | 1.20 | 1.83400 | 37.2 |
| 15 | 26.924 | 4.37 | 1.49700 | 81.5 |
| 16 | −23.334 | 0.12 | | |
| 17 | 38.196 | 5.75 | 1.49700 | 81.5 |
| 18 | −15.351 | 2.10 | 1.80610 | 33.3 |
| 19 | −39.005 | | | |
| Image plane | ∞ | | | |

Various Data

| | |
|---|---|
| Focal Length | 15.50 |
| F-number | 2.80 |
| Angle of View | 177.8° |
| Image Height | 21.30 |
| Lens Total Length | 106.60 |
| BF | 42.12 |

Numerical Example 2

Unit: mm

Surface Data

| Surface No. | r | d | nd | vd |
|---|---|---|---|---|
| 1 | 64.500 | 2.70 | 1.83481 | 42.7 |
| 2 | 18.800 | 10.03 | | |
| 3 | 83.550 | 2.30 | 1.48749 | 70.2 |
| 4 | 12.582 | 5.08 | | |
| 5 | 527.335 | 1.20 | 1.43875 | 95.0 |

-continued

Unit: mm

| | | | | |
|---|---|---|---|---|
| 6 | 26.822 | 4.49 | 1.80610 | 33.3 |
| 7 | −35.181 | 0.50 | | |
| 8 | −36.979 | 2.47 | 1.56219 | 44.5 |
| 9 | −15.301 | 3.36 | 1.83495 | 42.7 |
| 10 | 76.940 | 6.97 | | |
| 11 | −58.118 | 0.33 | | |
| 12 | 30.748 | 7.12 | 1.62401 | 41.5 |
| 13 | −40.990 | 4.37 | | |
| 14 | 324.265 | 1.20 | 1.83400 | 37.2 |
| 15 | 26.924 | 4.11 | 1.49700 | 81.5 |
| 16 | −25.385 | 0.11 | | |
| 17 | 43.156 | 5.75 | 1.43875 | 95.0 |
| 18 | −14.973 | 2.40 | 1.80610 | 33.3 |
| 19 | −33.655 | | | |
| Image plane | ∞ | | | |

Various Data

| | |
|---|---|
| Focal Length | 15.50 |
| F-number | 2.80 |
| Angle of View | 174° |
| Image Height | 21.30 |
| Lens Total Length | 105.25 |
| BF | 40.78 |

Numerical Example 3

Unit: mm

Surface Data

| Surface No. | r | d | nd | vd |
|---|---|---|---|---|
| 1 | 62.000 | 2.60 | 1.88300 | 40.8 |
| 2 | 18.800 | 14.93 | | |
| 3 | 35.322 | 1.80 | 1.80400 | 46.6 |
| 4 | 16.287 | 5.48 | | |
| 5 | −46.223 | 1.76 | 1.49700 | 81.5 |
| 6 | 13.376 | 7.00 | 1.80610 | 33.3 |
| 7 | −47.309 | 2.20 | | |
| 8 | −20.100 | 3.89 | 1.88300 | 40.8 |
| 9 | 40.029 | 7.50 | | |
| 10 | 18.752 | 2.00 | 1.67270 | 32.1 |
| 11 | −59.051 | 2.14 | | |
| 12 | ∞ | 2.09 | | |
| 13 | −26.832 | 1.30 | 1.88300 | 40.8 |
| 14 | 11.240 | 2.99 | 1.59270 | 35.3 |
| 15 | −29.783 | 0.81 | | |
| 16 | 27.363 | 4.60 | 1.49700 | 81.5 |
| 17 | −11.048 | 1.50 | 1.80610 | 33.3 |
| 18 | −167.229 | 0.26 | | |
| 19 | 83.923 | 5.22 | 1.45600 | 90.3 |
| 20 | −14.175 | 0.34 | | |
| 21* | 117.390 | 2.60 | 1.58313 | 59.4 |
| 22 | −48.280 | | | |
| Image plane | ∞ | | | |

Aspheric Coefficients r21 K = 0.00000e+000   A4 = −1.76963e−005   A6 = 3.26383e−008
    A8 = −1.05539e−009   A10 = 4.81924e−012

Various Data

| | |
|---|---|
| Focal Length | 8.60 |
| F-number | 4.05 |
| Angle of View | 178.4° |
| Image Height | 12.00 |
| Lens Total Length | 113.00 |
| BF | 40.00 |

Numerical Example 4

Unit: mm

Surface Data

| Surface No. | r | d | nd | vd |
|---|---|---|---|---|
| 1 | 62.000 | 2.60 | 1.88300 | 40.8 |
| 2 | 18.800 | 15.34 | | |
| 3 | 34.655 | 1.80 | 1.80400 | 46.6 |
| 4 | 16.780 | 5.59 | | |
| 5 | −47.555 | 1.71 | 1.49700 | 81.5 |
| 6 | 13.587 | 7.00 | 1.80610 | 33.3 |
| 7 | −49.423 | 2.42 | | |
| 8 | −20.234 | 3.72 | 1.88300 | 40.8 |
| 9 | 37.284 | 7.19 | | |
| 10 | 18.484 | 2.00 | 1.67270 | 32.1 |
| 11 | −60.380 | 2.03 | | |
| 12 | ∞ | 2.31 | | |
| 13 | −26.891 | 1.30 | 1.88300 | 40.8 |
| 14 | 10.356 | 2.97 | 1.59270 | 35.3 |
| 15 | −29.143 | 0.81 | | |
| 16 | 27.120 | 4.60 | 1.49700 | 81.5 |
| 17 | −11.055 | 1.49 | 1.80610 | 33.3 |
| 18 | −248.175 | 0.22 | | |
| 19 | 84.255 | 4.97 | 1.49700 | 81.5 |
| 20 | −13.797 | 0.33 | | |
| 21* | 108.923 | 2.60 | 1.58313 | 59.4 |
| 22 | −57.478 | | | |
| Image plane | ∞ | | | |

Aspheric Coefficients r21 K = 0.00000e+000   A4 = −1.67951e−005   A6 = 4.16847e−008
    A8 = −1.60921e−009   A10 = 7.97209e−012

Various Data

| | |
|---|---|
| Focal Length | 8.60 |
| F-number | 4.05 |
| Angle of View | 178.4° |
| Image Height | 12.00 |
| Lens Total Length | 113.01 |
| BF | 40.00 |

Numerical Example 5

Unit: mm

Surface Data

| Surface No. | r | d | nd | vd |
|---|---|---|---|---|
| 1 | 62.000 | 2.60 | 1.80400 | 46.6 |
| 2 | 18.100 | 15.87 | | |
| 3 | 44.270 | 1.80 | 1.80400 | 46.6 |
| 4 | 15.510 | 5.29 | | |
| 5 | −37.971 | 1.26 | 1.49700 | 81.5 |
| 6 | 13.995 | 7.00 | 1.80610 | 33.3 |
| 7 | −39.484 | 1.63 | | |
| 8 | −21.577 | 1.30 | 1.88300 | 40.8 |
| 9 | −953.223 | Variable | | |
| 10 | ∞ | 0.30 | | |
| 11 | 21.100 | 2.00 | 1.67270 | 32.1 |
| 12 | −139.710 | 0.99 | | |
| 13 (Stop) | ∞ | 1.99 | | |
| 14 | −32.692 | 0.84 | 1.88300 | 40.8 |
| 15 | 13.413 | 3.31 | 1.59270 | 35.3 |
| 16 | −68.214 | 0.28 | | |
| 17 | 34.223 | 4.60 | 1.48749 | 70.2 |
| 18 | −10.556 | 1.12 | 1.80610 | 33.3 |

-continued

Unit: mm

| | | | | |
|---|---|---|---|---|
| 19 | −104.234 | 0.22 | | |
| 20 | 103.460 | 4.97 | 1.49700 | 81.5 |
| 21 | −15.066 | 0.33 | | |
| 22* | 123.950 | 2.43 | 1.58313 | 59.4 |
| 23 | −42.350 | Variable | | |
| Image plane | ∞ | | | |

Aspheric Coefficients

| | | |
|---|---|---|
| r22 | K = 0.00000e+000 | A4 = −1.80715e−005 |
| | A6 = −1.97404e−008 | A8 = −4.11291e−011 |
| | A10 = −2.64822e−013 | |

Various Data
Zoom Ratio: 1.74

| | Wide-angle End | Middle focal length | Telephoto end |
|---|---|---|---|
| Focal Length | 8.60 | 11.44 | 15.01 |
| F-number | 4.05 | 4.05 | 4.05 |
| Angle of View | 175.6 | 168.6 | 180.4 |
| Image Height | 12.00 | 15.98 | 21.64 |
| Lens Total Length | 113.40 | 114.04 | 118.37 |
| BF | 39.99 | 47.17 | 56.22 |
| d9 | 13.27 | 6.73 | 2.01 |
| d23 | 39.99 | 47.17 | 56.22 |

Numerical Example 6

Unit: mm

Surface Data

| Surface No. | r | d | nd | vd |
|---|---|---|---|---|
| 1 | 59.840 | 2.50 | 1.80400 | 46.6 |
| 2 | 17.282 | 14.64 | | |
| 3 | 129.723 | 1.61 | 1.59282 | 68.6 |
| 4 | 21.610 | 6.44 | | |
| 5 | −86.935 | 1.36 | 1.59282 | 68.6 |
| 6 | 31.102 | 0.15 | | |
| 7 | 22.525 | 7.45 | 1.80518 | 25.4 |
| 8 | −110.226 | 5.82 | | |
| 9* | −31.089 | 1.20 | 1.85135 | 40.1 |
| 10 | −844.340 | Variable | | |
| 11 | ∞ | 1.46 | | |
| 12 | 43.413 | 1.62 | 1.88300 | 40.8 |
| 13 | −94.260 | 1.85 | | |
| 14 (Stop) | ∞ | 1.70 | | |
| 15 | −19.292 | 0.75 | 1.88300 | 40.8 |
| 16 | 32.493 | 3.22 | 1.51823 | 58.9 |
| 17 | −20.261 | 0.20 | | |
| 18 | 194.716 | 4.25 | 1.48749 | 70.2 |
| 19 | −12.377 | 0.80 | 1.88300 | 40.8 |
| 20 | −27.182 | 0.20 | | |
| 21 | 712.893 | 3.28 | 1.59270 | 35.3 |
| 22 | −21.620 | 0.35 | | |
| 23 | −60941.798 | 0.93 | 1.83400 | 37.2 |
| 24 | 28.231 | 4.77 | 1.49700 | 81.5 |
| 25 | −34.279 | 0.20 | | |
| 26 | −80910.795 | 1.68 | 1.48749 | 70.2 |
| 27 | −87.072 | Variable | | |
| Image plane | ∞ | | | |

Aspheric Coefficients

| | | | |
|---|---|---|---|
| r9 | K = 0.00000e+000 | A4 = −6.64162e−006 | A6 = 2.58871e−008 |
| | A8 = −8.99837e−010 | A10 = 1.12233e−011 | |
| | A12 = −5.07106e−014 | | |

Various Data
Zoom Ratio: 1.88

| | | | | |
|---|---|---|---|---|
| Focal Length | 8.05 | 11.85 | 15.14 | |
| F-number | 4.12 | 4.12 | 4.12 | |
| Angle of View | 174 | 175 | 175 | |
| Image Height | 11.15 | 16.77 | 21.64 | |
| Lens Total Length | 129.57 | 127.26 | 129.98 | |
| BF | 40.25 | 49.58 | 57.66 | |
| d10 | 20.89 | 9.25 | 3.89 | 14.85 |
| d27 | 40.25 | 49.58 | 57.66 | 44.20 |

Various Data of Each Unit

| Lens unit | First surface | Focal length |
|---|---|---|
| 1 | 1 | −10.91 |
| 2 | 11 | 26.80 |

TABLE 1

| | Numerical Example | | | | | |
|---|---|---|---|---|---|---|
| Condition | 1 | 2 | 3 | 4 | 5 | 6 |
| (1) | | | | | | |
| (Left part) | 0.0309 | 0.0499 | 0.0309 | 0.0309 | 0.0309 | 0.0157 |
| (2) | 1.99 | 2.03 | 1.98 | 1.98 | WE: 2.01 | WE: 2.012 |
| | | | | | TE: 2.03 | TE: 2.066 |
| (3) | −2.137 | −2.10726 | −3.656 | −3.656 | −3.797 | −3.855 |
| (4) | 1.374 | 1.973 | 0.657 | 0.67 | 0.625 | 1.417 |
| (5) | 0.554 | 0.549 | 0.535 | 0.535 | 0.548 | 0.552 |
| (6) | 1.80400 | 1.83481 | 1.88300 | 1.88300 | 1.80400 | 1.80400 |
| (7) | 46.6 | 42.7 | 40.8 | 40.8 | 46.6 | 46.6 |
| (8) | | | | | | |
| (Left part) (9) | 0.0309 | 0.0499 | 0.0309 | 0.0309 | 0.0309 | — |
| (Left part) | 0.4708 | 0.4840 | 0.4708 | 0.4708 | 0.4708 | — |
| (Right part) | 0.5878 | 0.5340 | 0.5878 | 0.5878 | 0.5878 | — |

*Note:
In Table 1, "WE" denotes "wide-angle end" and "TE" denotes "telephoto end".

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-001095 filed Jan. 6, 2010, which is hereby incorporated by reference herein in its entirety.

What is claimed is:

1. An optical system comprising, in order from an object side to an image side:
   a first lens unit;
   a stop; and
   a second lens unit,
   wherein the first lens unit includes:
      a first negative lens having a meniscus shape and a negative refractive power at a position closest to the object side; and
      a negative lens Gn having a negative refractive power at a position closer to the image side than the first negative lens,
   wherein the second lens unit includes a positive lens Gp having a positive refractive power,
   wherein a material of each of the negative lens Gn and the positive lens Gp satisfies the following condition:

$\theta gF - (-0.001682 \cdot vd + 0.6438) \geq 0.01$ where "vd" denotes an Abbe number of a lens material and "θgF" denotes a relative partial dispersion with respect to g-line light and F-line light, and
   wherein an angle (θ) to an optical axis of an off-axis principal ray incident on a lens surface of the first negative lens facing the object side at an arbitrary image height y and a focal length (f) of the entire optical system satisfy the following condition:

$1.8 \leq (y/f \sin(\theta/2)) \leq 2.1$.

2. The optical system according to claim 1, wherein a focal length of the first negative lens (f1) and the focal length of the entire optical system (f) satisfy the following condition:

$-4.5 \leq f1/f - 1.8$.

3. The optical system according to claim 1, wherein a focal length of the negative lens Gn (fex) and a focal length of the first negative lens (f1) satisfy the following condition:

$0.3 \leq fex/f1 \leq 2.1$.

4. The optical system according to claim 1, wherein radiuses of curvature of surfaces of the first negative lens on the object side and on the image side, respectively (r1, r2) and a shape factor of the first negative lens (SH1(=(r1−r2)/(r1+r2)) satisfy the following condition:

$0.4 \leq SH1 \leq 1.0$.

5. The optical system according to claim 1, wherein a refractive index of a material of the first negative lens (Nd) and an Abbe number of the material of the first negative lens (vd) satisfy the following conditions:

$1.63 \leq Nd \leq 1.89$ $40 \leq vd \leq 61$.

6. The optical system according to claim 1, wherein a part of the first lens unit moves in a direction of the optical axis during focusing.

7. The optical system according to claim 1, wherein the first lens unit includes a cemented lens including a negative lens GCn having a negative refractive power and a positive lens GCp having a having a positive refractive power cemented to each other, and
   wherein an Abbe number of a material of the negative lens GCn (vdn) and a relative partial dispersion of the material of the negative lens GCn with respect to g-line light and F-line light (θgFn) satisfy the following condition:

$\theta gFn - (-0.001682 \cdot vdn + 0.6438) \geq 0.01$.

8. The optical system according to claim 7, wherein an Abbe number of a material of the positive lens GCp (vdp) and a relative partial dispersion of the material of the positive lens GCp with respect to g-line light and F-line light (θgFp) satisfy the following condition:

$\theta gFp \leq -0.001682 \cdot vdp + 0.6438$.

9. The optical system according to claim 1, wherein the second lens unit includes a positive lens having an aspheric surface whose positive refractive power becomes more intense from a center of the positive lens towards a periphery thereof at a position closest to the object side.

10. The optical system according to claim 1, wherein the optical system has a zooming function for zooming from a wide-angle end to a telephoto end by both the first lens unit and the second lens unit moving towards the object side in such a way that a distance between the first lens unit and the second lens unit becomes narrower.

11. The optical system according to claim 10, wherein a focal length (fa) of the entire optical system at the wide-angle end or at the telephoto end and the angle (θ) to the optical axis of an off-axis principal ray incident on the lens surface of the first negative lens facing the object side at the arbitrary image height y satisfy the following condition:

$y \leq 1500 \cdot fa \cdot \sin(\theta/2)/(750 - 2 \cdot fa \cdot \sin(\theta/2))$.

12. An image pickup apparatus comprising the optical system according to claim 1.

* * * * *